(12) United States Patent
Kim et al.

(10) Patent No.: US 11,390,141 B2
(45) Date of Patent: Jul. 19, 2022

(54) HEAT PUMP SYSTEM FOR VEHICLE

(71) Applicants: Hyundai Motor Company, Seoul (KR); Kia Motors Corporation, Seoul (KR)

(72) Inventors: Jeawan Kim, Gwangmyeong-si (KR); Jae Yeon Kim, Hwaseong-si (KR); Yeonho Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 126 days.

(21) Appl. No.: 17/096,197

(22) Filed: Nov. 12, 2020

(65) Prior Publication Data

US 2021/0387505 A1 Dec. 16, 2021

(30) Foreign Application Priority Data

Jun. 16, 2020 (KR) .................. 10-2020-0072850

(51) Int. Cl.
*F28D 15/00* (2006.01)
*B60H 1/00* (2006.01)
*B60H 1/32* (2006.01)
*H01M 10/663* (2014.01)
*H01M 10/625* (2014.01)

(52) U.S. Cl.
CPC ..... *B60H 1/00899* (2013.01); *B60H 1/00278* (2013.01); *B60H 1/3227* (2013.01); *H01M 10/625* (2015.04); *H01M 10/663* (2015.04); *B60H 2001/00307* (2013.01); *B60L 2240/545* (2013.01); *H01M 2220/20* (2013.01)

(58) Field of Classification Search
CPC ............ B60H 1/00899; B60H 1/00278; B60H 1/3227; B60H 2001/00307; H01M 10/625; H01M 10/663; H01M 2220/20; B60L 2240/545
USPC .................................................. 165/104.19
See application file for complete search history.

(56) References Cited

U.S. PATENT DOCUMENTS 8,215,432 B2 7/2012 Nemesh et al.
8,899,062 B2 12/2014 Kadle et al.
(Continued)

FOREIGN PATENT DOCUMENTS

CN 103380339 B 2/2012
JP 5336033 B2 1/2013
WO WO 2012112760 A1 1/2016

*Primary Examiner* — Davis D Hwu
(74) *Attorney, Agent, or Firm* — Morgan, Lewis & Bockius LLP

(57) ABSTRACT

A heat pump system may include a cooling apparatus of circulating a coolant in a coolant line to cool at least one electrical component provided in the coolant line; a battery cooling apparatus of circulating the coolant to the battery module; a chiller for heat exchanging the coolant with a refrigerant to control a temperature of the coolant; a heating apparatus that heats an interior of the vehicle using the coolant; a branch line; a chiller connection line connecting the chiller and the first valve; and wherein the reservoir tank is provided in the coolant line between the radiator and the first valve, and is connected to the coolant line connecting the first valve and the first water pump through the supply line, and wherein a condenser included in the air conditioner is connected to the heating line to pass the coolant circulating through the heating apparatus.

20 Claims, 9 Drawing Sheets

(56) References Cited

U.S. PATENT DOCUMENTS

| | | |
|---|---|---|
| 9,109,840 B2 | 8/2015 | Kadle et al. |
| 9,239,193 B2 | 1/2016 | Kadle et al. |
| 11,325,444 B2* | 5/2022 | Kim .................. B60H 1/00907 |
| 2013/0283838 A1 | 10/2013 | Kadle et al. |
| 2021/0061067 A1* | 3/2021 | Kim ..................... B60H 1/3213 |
| 2021/0129627 A1* | 5/2021 | Kim ....................... B60H 1/143 |
| 2021/0402844 A1* | 12/2021 | Kim ..................... B60H 1/3227 |
| 2022/0032736 A1* | 2/2022 | Kim .................. B60H 1/00885 |
| 2022/0111698 A1* | 4/2022 | Kim .................. B60H 1/00821 |

* cited by examiner

HEAT PUMP SYSTEM FOR VEHICLE

CROSS-REFERENCE TO RELATED APPLICATION

The present application claims priority to Korean Patent Application No. 10-2020-0072850 filed on Jun. 16, 2020, the entire contents of which is incorporated herein for all purposes by this reference.

BACKGROUND OF THE INVENTION

Field of the Invention

The present invention relates to a heat pump system for a vehicle. More particularly, the present invention relates to a heat pump system for a vehicle which adjusts a temperature of a battery module by use of one chiller that performs heat exchange between a refrigerant and a coolant and improves heating efficiency by use of waste heat generated from an electrical component.

Description of Related Art

In general, an air conditioner for a vehicle includes an air conditioning system for circulating a coolant to heat or cool an interior of the vehicle.

Such an air conditioner maintains a comfortable indoor environment by maintaining an internal temperature of the vehicle at an appropriate level regardless of an external temperature change, so that the interior of the vehicle is warmed or cooled through heat exchange by a condenser and an evaporator during a process in which a refrigerant discharged by driving of a compressor circulates back to the compressor after passing through a condenser, a receiver dryer, an expansion valve, and an evaporator.

That is, the air conditioner system condenses a gaseous coolant of a high temperature and a high pressure compressed by the compressor in a cooling mode in the summer to reduce a temperature and humidity of the interior of the vehicle through evaporation in the evaporator through the receiver dryer and the expansion valve.

Meanwhile, in recent years, as interest in energy efficiency and environmental pollution has been increasing, there has been a demand for the development of environmentally friendly vehicles configured for substantially replacing internal combustion engine vehicles. The environmentally friendly vehicles are usually fuel cell or electric vehicles driven by electricity or a hybrid vehicle driven by an engine and a battery.

Among the environmentally friendly vehicles, the electric vehicle or the hybrid vehicle does not use a separate heater, unlike an air conditioner of a general vehicle, and the air conditioner applied to the environmentally friendly vehicle is referred to as a heat pump system.

On the other hand, in the case of the electric vehicle, chemical reaction energy of oxygen and hydrogen is converted into electrical energy to generate driving force. In the present process, since thermal energy is generated by the chemical reaction in the fuel cell, effectively removing the generated heat is essential in securing performance of the fuel cell.

Furthermore, even in the hybrid vehicle, a motor is driven by use of the electricity supplied from the fuel cell or an electric battery together with an engine that operates by general fuel to generate the driving force, and as a result, the performance of the motor may be secured only by effectively removing the heat generated from the fuel cell or the battery and the motor.

As a result, in the hybrid vehicle or the electric vehicle, a battery cooling system needs to be separately formed with a separate sealing circuit together with a cooler and the heat pump system to prevent the heat generation in the motor and electrical components, and the battery including the fuel cell.

Accordingly, the size and weight of a cooling module mounted in the front of the vehicle increase and a layout of connection pipes that supply the refrigerant and the coolant to the heat pump system, the cooler, and the battery cooling system is complicated in an engine compartment.

Furthermore, the battery cooling system which heats or cools the battery according to a status of the vehicle for the battery to show optimal performance is separately provided, and as a result, a plurality of valves for connection with the respective connection pipes are adopted and noise and vibration due to frequent opening and closing operations of the valves are transferred to the interior of the vehicle to degrade ride comfort.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a heat pump system for a vehicle, which adjusts a temperature of a battery module by use of one chiller that performs heat exchange between a refrigerant and a coolant and improves heating efficiency by use of waste heat generated from an electrical component.

Various aspects of the present invention are directed to providing the heat pump system for the vehicle, including: a cooling apparatus configured to include a radiator, a first water pump, a first valve, a second valve, and a reservoir tank which are connected through a coolant line, and to circulate a coolant in the coolant line to cool at least one electrical component provided in the coolant line; a battery cooling apparatus configured to include a battery coolant line connected to the coolant line through the first valve, and a second water pump and a battery module which are connected through the battery coolant line to circulate the coolant in the battery module; a chiller provided in the battery coolant line between the first valve and the battery module, and connected to a refrigerant line of an air conditioner through a refrigerant connection line, to adjust a temperature of the coolant by performing heat exchange between the coolant which is circulated in the battery coolant line and a refrigerant which is selectively supplied from the air conditioner; a heating apparatus including a heating line connected to the coolant line through the second valve to heat a vehicle interior by use of a coolant and a third water pump and a heater provided on the heating line; a branch line having a first end portion connected to the coolant line between the radiator and the second valve, and a second end portion connected to the first valve; and a chiller connection line connecting the chiller and the first valve separately from the battery coolant line, wherein the reservoir tank is provided in the coolant line between the radiator and the first valve, and is connected to the coolant line connecting the first valve and the first water pump through the supply line, and wherein a condenser included in the air conditioner is connected to the heating line to pass the coolant circulating through the heating apparatus.

The first valve may include: a first port connected to the coolant line connected to the reservoir tank; a second port connected to the coolant line connected to the first water pump; a third port connected to the chiller connection line; a fourth port connected to the branch line; a fifth port connected to the battery coolant line connected to the chiller; and a sixth port connected to the battery coolant line connected to the second water pump.

The first valve may be operated to discharge the coolant through a port adjacent to a port into which coolant is introduced among the first port, the second port, the third port, the fourth port, the fifth port and the sixth port.

The air conditioner may include: a heating, ventilation, and air conditioning (HVAC) module configured to include an evaporator which is connected thereto through the refrigerant line and a door configured to control outside air passing through the evaporator to be selectively introduced into the heater depending on a cooling mode, a heating mode, and a heating and dehumidification mode of the vehicle therein; a condenser provided in the heating line between the second valve and the heater to circulate a coolant therein to perform heat exchange between the coolant and a refrigerant supplied through the refrigerant line; a compressor connected between the evaporator and the condenser through the refrigerant line; a heat exchanger provided on the refrigerant line between the condenser and the evaporator; a first expansion valve provided in the refrigerant line between the heat exchanger and the evaporator; a second expansion valve provided in the refrigerant connection line; an accumulator provided in the refrigerant line between the evaporator and the compressor and connected to the refrigerant connection line; and a third expansion valve provided in the refrigerant line between the condenser and the heat exchanger.

The heat exchanger may additionally condense or evaporate the refrigerant condensed in the condenser through heat exchange with the outside air depending on a selective operation of the third expansion valve.

The second expansion valve may expand the refrigerant introduced through the refrigerant connection line to flow to the chiller when cooling the battery module by the refrigerant, and the third expansion valve may selectively expand the refrigerant introduced into the heat exchanger in the heating mode and a low temperature dehumidification mode of the vehicle.

A first end portion of the refrigerant connection line may be connected to the refrigerant line between the heat exchanger and the first expansion valve, and a second end portion of the refrigerant connection line may be connected to the accumulator.

Each of the chiller and the condenser may be a water-cooled heat exchanger, and the heat exchanger may be an air-cooled heat exchanger.

The HVAC module may further include an air heater provided at a side opposite to the evaporator with respect to the heater which is interposed between the air heater and the evaporator to selectively heat the outside air passing through the heater.

The air heater may be operated to raise a temperature of the outside air passing through the heater when a temperature of a coolant supplied to the heater is lower than a target temperature for internal heating.

When the battery module is cooled in the cooling mode of the vehicle, in the cooling apparatus, the coolant may be circulated in the coolant line by the operation of the first water pump, and the supply line may be opened; the branch line and the chiller connection line may be closed through operation of the first valve; the coolant line and the battery coolant line may form an independent closed circuits through operation of the first valve; in the battery cooling apparatus, the coolant passing through the chiller may be supplied to the battery module along the battery coolant line through operation of the second water pump; in the heating apparatus, the coolant line and the heating line may be connected through operation of the second valve so that the coolant is supplied from the cooling apparatus; in the air conditioner, in a state that the refrigerant connection line is opened through operation of the second expansion valve, the refrigerant may circulate along the refrigerant line and the refrigerant connection line; the first and second expansion valves may expand the refrigerant so that the expanded refrigerant is respectively supplied to the evaporator and the chiller; and the third expansion valve may inflow the refrigerant supplied from the condenser to the heat exchanger.

The heating apparatus may supply the coolant supplied from the cooling apparatus through operation of the third water pump to the condenser, and the condenser may condense the refrigerant through heat exchange with the coolant, and the heat exchanger may additionally condense the refrigerant introduced from the condenser through heat exchange with the outside air.

When recovering a waste heat of an external heat source and the electrical component in the heating mode of the vehicle, the branch line and the chiller connection line may be opened through operation of the first valve, and the supply line may be opened; in the cooling apparatus, on the basis of the branch line, a portion of the coolant lines respectively connected to the radiator and the reservoir tank may be closed, and the coolant passing through the electrical component may circulate along the opened branch line and an opened portion of the coolant line without passage through the radiator through operation of the first water pump; the coolant introduced into the first valve through the branch line may be introduced into the chiller along a portion of the battery coolant line connecting the chiller and the first valve; the coolant passing through the chiller may be introduced into the first valve along the opened chiller connection line, and then may be circulated in the coolant line connected to the electrical component through the first valve; the coolant line and the heating line may form an independent closed circuits through operation of the second valve, respectively; in the heating apparatus, the coolant may circulate along the heating line through operation of the third water pump; in the air conditioner, the refrigerant line connecting the condenser and the evaporator may be closed through operation of the first expansion valve; the refrigerant connection line may be opened through operation of the second expansion valve; the second expansion valve may expand a refrigerant supplied to the refrigerant connection line and may supply the expanded refrigerant to the chiller; and the third expansion valve may expand the refrigerant supplied from the condenser to be supplied to the heat exchanger.

When recovering a waste heat of an external heat source and the battery module in the heating mode of the vehicle, the branch line and the chiller connection line may be closed through operation of the first valve, and the supply line may be closed; the cooling apparatus may be deactivated; in the battery cooling apparatus, the battery coolant line may not be connected to the coolant line through operation of the first valve, and the coolant passing through the battery module may be supplied to the chiller through operation of the second water pump; in the heating apparatus, the heating line may not be connected to the coolant line through operation of the second valve, and the coolant may circulate along the heating line through operation of the third water pump; in the air conditioner, the refrigerant line connecting the condenser and the evaporator may be closed through operation of the first expansion valve; the refrigerant connection line may be opened through operation of the second expansion valve; the second expansion valve may expand a refrigerant supplied to the refrigerant connection line and may supply the expanded refrigerant to the chiller; and the third expansion valve may expand the refrigerant supplied from the condenser to be supplied to the heat exchanger.

When performing a low temperature dehumidification mode of the vehicle, the branch line and the chiller connection line may be opened through operation of the first valve, and the supply line may be opened; in the cooling apparatus, on the basis of the branch line, a portion of the coolant lines respectively connected to the radiator and the reservoir tank may be closed, and the coolant passing through the electrical component may circulate along the opened branch line and an opened portion of the coolant line without passage through the radiator through operation of the first water pump; the coolant introduced into the first valve through the branch line may be introduced into the chiller along a portion of the battery coolant line connecting the chiller and the first valve; the coolant passing through the chiller may be introduced into the first valve along the opened chiller connection line, and then may be circulated in the coolant line connected to the electrical component through the first valve; the coolant line and the heating line may form an independent closed circuits through operation of the second valve, respectively; in the heating apparatus, the coolant may circulate along the heating line through operation of the third water pump; in the air conditioner, the refrigerant may be circulated along the refrigerant line and the refrigerant connection line opened through operation of the first and second expansion valves, respectively; the first and second expansion valves may expand the refrigerant so that the expanded refrigerant is respectively supplied to the evaporator and the chiller; the third expansion valve may expand the refrigerant supplied from the condenser to be supplied to the heat exchanger.

When cooling the electrical component and the battery module by use of the coolant, the branch line may be closed through operation of the first valve; the chiller connection line may be opened through operation of the first valve, and the supply line may be opened; a portion of the battery coolant line connecting the chiller and the first valve may be closed through operation of the first valve; the coolant line connecting the reservoir tank and the first valve may be connected to the battery coolant line through operation of the first valve; the coolant cooled in the radiator may pass through the battery module along the battery coolant line from the first valve through operation of the first and second water pumps; the coolant passing through the battery module may be introduced from the chiller to the first valve along the opened chiller connection line, and then may be supplied to the electrical component while flowing along the coolant line connected to the first water pump.

When using the waste heat of the electrical component without operating the air conditioner in the heating mode of the vehicle, the branch line and the chiller connection line may be opened through operation of the first valve; in the cooling apparatus, on the basis of the branch line, the coolant line connected to the radiator, the reservoir tank, and the first valve may be closed; the supply line may be opened; the battery coolant line except for the battery coolant line connected to the chiller may be closed through operation of the first valve; in the heating apparatus, the heating line may be connected to the coolant line through operation of the second valve; the coolant having the temperature that has risen while passing through the electrical component by the operation of the first water pump may be supplied to the heating line connected to the opened coolant line without passing through the radiator; the coolant introduced into the heating line may be supplied to the heater through operation of the third water pump; the coolant discharged from the heater may be introduced into the first valve along the opened coolant line and the opened branch line; the coolant introduced into the first valve may be again introduced into the first valve along the opened chiller connection line after passing through the chiller along the opened portion of the battery coolant line; and the coolant again introduced into the first valve may be supplied to the electrical component along the opened the coolant line.

When using the waste heat of the electrical component without operating the air conditioner and cooling of the electrical component is required, in the heating mode of the vehicle, the branch line and the chiller connection line may be closed through operation of the first valve; in the cooling apparatus, the coolant line may be opened; the supply line may be opened; the battery cooling apparatus may be deactivated; in the heating apparatus, the heating line may be connected to the coolant line through operation of the second valve; the coolant having the temperature that has risen while passing through the electrical component by the operation of the first water pump may be supplied to the heating line connected to the coolant line; the coolant introduced into the heating line may be supplied to the heater through operation of the third water pump; and the coolant discharged from the heater may be cooled while passing through the radiator along the coolant line through operation of the first water pump, and then may recover waste heat from the electrical component while passing through the electrical component and cools the electrical component at the same time.

The first valve may be a 6-way valve, and the second valve may be a four-way valve.

The electrical component may include an electric power control unit (EPCU), or a motor, or an inverter, or an autonomous driving controller, or an on board charger (OBC).

The supply line may be connected to the coolant line when the coolant is circulated to the coolant line by the operation of the first water pump.

The battery cooling apparatus may further include a first coolant heater provided in the battery coolant line between the battery module and the chiller.

When the battery module is heated, the first coolant heater may be operated to heat a coolant supplied to the battery module along the battery coolant line.

A described above, according to the heat pump system for the vehicle according to various exemplary embodiments of the present invention, the temperature of the battery module may be adjusted depending on the mode of the vehicle by use of one chiller for performing heat exchange between the coolant and the refrigerant, and the interior of the vehicle may be heated by use of the coolant, simplifying the entire system.

According to various exemplary embodiments of the present invention, it is also possible to improve the heating efficiency by recovering waste heat from the electrical component and waste heat from the battery module and using it for internal heating.

Furthermore, according to various exemplary embodiments of the present invention, it is possible to optimize the performance of the battery module by efficiently controlling the temperature of the battery module, and increase an overall travel distance of the vehicle through efficient management of the battery module.

Furthermore, according to various exemplary embodiments of the present invention can use the coolant heater applied to the heating apparatus may be used to heat the battery module or to assist in an internal heating of the vehicle, reducing the cost and weight.

Furthermore, according to various exemplary embodiments of the present invention, heat of outside air, and waste heat of an electrical component, and a battery module is selectively used in a heating mode of the vehicle, enhancing heating efficiency.

Furthermore, according to various exemplary embodiments of the present invention may improve the cooling performance and reducing power consumption of a compressor by increasing condensation or evaporation performance of the refrigerant using a condenser and a heat exchanger.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
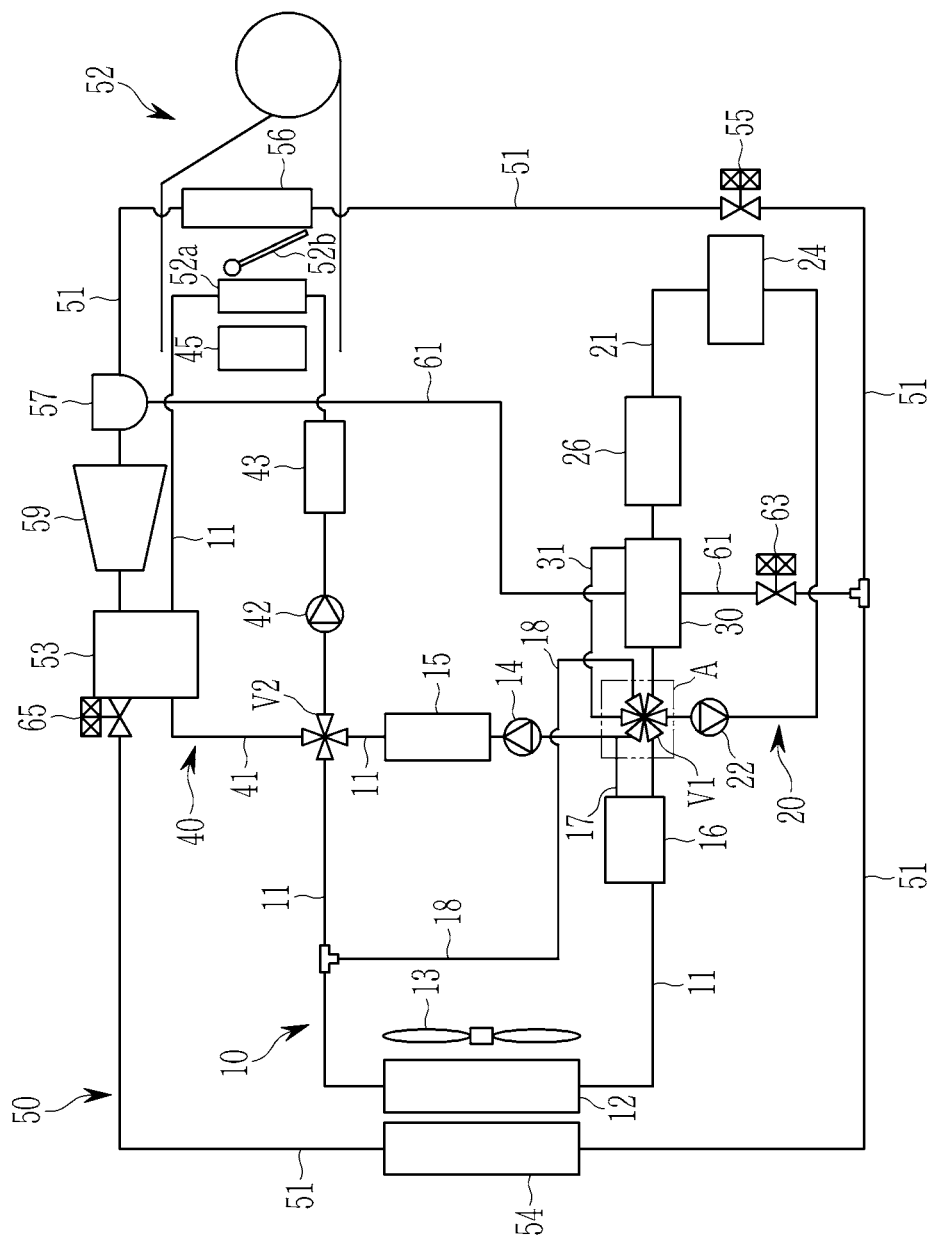
FIG. 1 illustrates a block diagram of a heat pump system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will hereinafter be described in detail with reference to the accompanying drawings.

Exemplary embodiments described in the exemplary embodiment and configurations shown in the drawings are just the most preferable exemplary embodiments of the present invention, but do not limit the spirit and scope of the present invention. Therefore, it may be understood that there may be various equivalents and modifications configured for replacing them at the time of filing of the present application.

To clarify the present invention, parts that are not connected to the description will be omitted, and the same elements or equivalents are referred to by the same reference numerals throughout the specification.

The size and thickness of each element are arbitrarily shown in the drawings, but the present invention is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Furthermore, the terms, " . . . unit", " . . . mechanism", " . . . portion", " . . . member", etc. used herein mean a unit of inclusive components performing at least one or more functions or operations.

Figure 2:
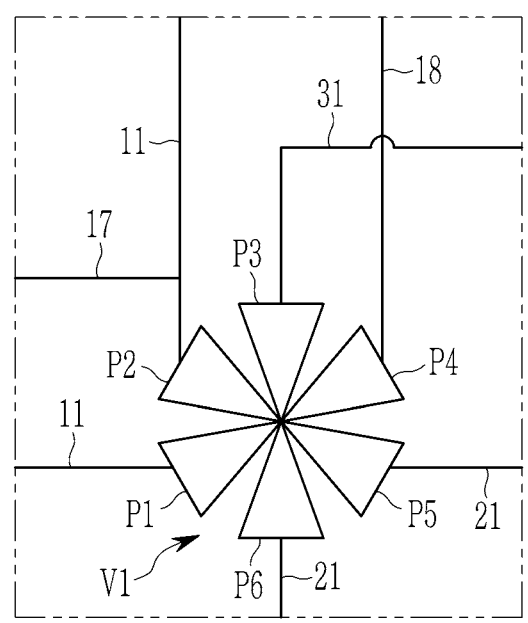
FIG. 2 is an enlarged view of part A of FIG. 1.

FIG. 1 is a block diagram of a heat pump system for a vehicle according to various exemplary embodiments of the present invention, and FIG. 2 is an enlarged view of part A of FIG. 1.

The heat pump system for the vehicle according to various exemplary embodiments of the present invention may adjust a temperature of a battery module 24 by use of one chiller 30 in which a refrigerant and a coolant are heat exchanged, and may recover waste heat generated from an electrical component 15 and a battery module 24 to use it for internal heating.

Such the heat pump system may be applied to electric vehicles.

Referring to FIG. 1, the heat pump system may include a cooling apparatus 10, a battery cooling apparatus 20, a chiller 30, and a heating apparatus 40.

First, the cooling apparatus 10 includes a radiator 12 connected to a coolant line 11, a first water pump 14, a first valve V1, a second valve V2, and a reservoir tank 16.

The radiator 12 is mounted in the front of the vehicle, and a cooling fan 13 is mounted behind the radiator 12, so that the coolant is cooled through an operation of the cooling fan 13 and heat exchange with the outside air.

Furthermore, the electrical component 15 may include an electric power control unit (EPCU), or a motor, or an inverter, or an autonomous driving controller, or an on board charger (OBC).

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, or the motor, or the inverter, or the autonomous driving controller, or the OBC may be recovered.

Also, the reservoir tank 16 is provided on the coolant line 11 between the radiator 12 and the first water pump 14. The coolant cooled in the radiator 12 may be stored in the reservoir tank 16.

This cooling apparatus 10 may circulate the coolant in the coolant line 11 through operation of the first water pump 14 such that the coolant is supplied to the electrical component 15 provided in the coolant line 11.

Meanwhile, the reservoir tank 16 may be connected to the coolant line 11 connecting the first valve V1 and the first water pump 14 through a supply line 17.

The supply line 17 may be connected to the coolant line 11 when the coolant is circulated to the coolant line 11 by the operation of the first water pump 14.

That is, when the first water pump 14 is operated, the reservoir tank 16 may always flow a portion of the stored coolant into the coolant line 11 through the supply line 17.

Accordingly, when the first water pump 14 is operated, the occurrence of cavitation in the first water pump 14 may be prevented. Furthermore, a damage of the first water pump 14 due to the cavitation may be prevented in advance.

Furthermore, the cooling apparatus 10 may further include a branch line 18.

A first end portion of the branch line 18 is connected to the coolant line 11 between the radiator 12 and the second valve V2. A second end portion of the branch line 18 may be connected to the first valve V1.

When the waste heat of the electrical component 15 is recovered, the branch line 18 may be selectively opened or closed through operation of the first valve V1 so that the coolant that has passed through the electric equipment 15 is supplied back into the electric equipment 15 without passing through the radiator 12.

In the exemplary embodiment of the present invention, the battery cooling apparatus 20 includes a battery coolant line 21 connected to the coolant line 11 through the first valve V1 and a second water pump 22 and the battery module 24 connected to the battery coolant line 21.

The battery cooling apparatus 20 may selectively circulate the coolant in the battery module 24 through an operation of the second water pump 22.

Herein, the first and second water pumps 14 and 22 may be electric water pumps.

Meanwhile, the battery cooling apparatus 20 may further include a first coolant heater 26 provided in the battery coolant line 21 between the battery module 24 and the first valve V1.

When it is required to increase the temperature of the battery module 24, the first coolant heater 26 is turned on to heat the coolant circulated in the battery coolant line 21 such that the coolant of which temperature is increased may be supplied to the battery module 24.

The first coolant heater 26 may be an electric heater that operates according to supply of electric power.

That is, the first coolant heater 26 is operated when the temperature of the coolant supplied to the battery module 24 is lower than the target temperature, so that the coolant circulating in the battery coolant line 21 may be heated.

Accordingly, the coolant having an increased temperature while passing through the first coolant heater 26 may be supplied to the battery module 24, to raise the temperature of the battery module 24.

That is, the first coolant heater 26 may selectively operate when the temperature of the battery module 24 is raised.

In the exemplary embodiment of the present invention, the chiller 30 is provided in the battery coolant line 21 between the first valve V1 and the battery module 24.

The chiller 30 is connected to a refrigerant line 51 of an air conditioner 50 through a refrigerant connection line 61. That is, the chiller 30 may be a water-cooled heat exchanger into which a coolant flows.

Herein, the chiller 30 may be connected to the first valve V1 through a chiller connection line 31.

That is, the chiller connection line 31 may connect the chiller 30 and the first valve V1 separately from the battery coolant line 21 by the operation of the first valve V1.

Accordingly, the chiller 30 may regulate the temperature of the coolant by performing heat exchange between the coolant which is selectively supplied to the battery coolant line 21 and the chiller connection line 31, and the refrigerant which is selectively supplied from the air conditioner 50.

Herein, a first end portion of the chiller connection line 31 is connected to the first valve V1. A second end portion of the chiller connection line 31 may be connected to the chiller 30.

The chiller connection line 31 may connect the chiller 30 to the first valve V1 according to the operation of the first valve V1.

The heating apparatus 40 may include a heating line 41 selectively connectable to the coolant line 11 through a second valve V2 to heat a vehicle interior by use of the coolant and a third water pump 42 and a heater 52a provided on the heating line 41.

When an interior of the vehicle is heated, the heating device 40 may connect the coolant line 11 and the heating line 41 connected to the electrical component 15 by the operation of the second valve V2 such that the high-temperature coolant that has passed through the electrical component 15 is supplied to the heating line 41.

Accordingly, the high-temperature coolant may be supplied to the heater 52a along the heating line 41.

That is, the heating apparatus 40 constructed as described above supplies the high temperature coolant introduced from the cooling apparatus 10 to the heating line 41 in the heating mode of the vehicle or the coolant of which the temperature is increased while circulating through the heating line 41 to the heater 52a through operation of the third water pump 42, heating the vehicle interior.

Herein, the third water pump 42 may be electric water pump.

Meanwhile, the heater 52a may be provided inside a heating, ventilation, and air conditioning (HVAC) module 52 included in the air conditioner 50.

Herein, a second coolant heater 43 to selectively heat the coolant circulating in the heating line 41 may be provided in the heating line 41 between the third water pump 42 and the heater 52a.

The second coolant heater 43 is ON-operated when the temperature of the coolant supplied to the heater 52a in the heating mode of the vehicle is lower than a target temperature to heat the coolant circulated in the heating line 41, inflowing the coolant of which the temperature is increased to the heater 52a.

The second coolant heater 43 may be an electric heater that operates according to the power supply.

On the other hand, in the exemplary embodiment of the present invention, it is described that the second coolant heater 43 is provided in the heating line 41, however it is not limited thereto, and an air heater 45 to increase the temperature of the outside air inflowing to the interior of the vehicle may be applied instead of the second coolant heater 43.

The air heater 45 may be mounted on the rear of the heater 52a toward the interior of the vehicle inside the HVAC module 52 to selectively heat the outside air passing through the heater 52a.

That is, any one of the second coolant heater 43 and the air heater 45 may be applied to the heating apparatus 40.

The heating apparatus 40 constructed as described above supplies the high temperature coolant inflowed from the cooling apparatus 10 to the heating line 41 in the heating mode of the vehicle or the coolant of which the temperature is increased while circulating through the heating line 41 to the heater 52a through operation of the third water pump 42, heating the vehicle interior.

In the exemplary embodiment of the present invention, the air conditioner 50 includes the HVAC module 52, a condenser 53, a heat exchanger 54, a first expansion valve 55, an evaporator 56, an accumulator 57, and a compressor 59 which are connected through the refrigerant line 51.

First, the HVAC module 52 includes the evaporator 56 connected therewith through the refrigerant line 51, and an opening and closing door 52b for controlling the outside air passing through the evaporator 56 to be selectively introduced into the heater 52a depending on cooling mode, heating mode, and heating and dehumidification modes of the vehicle therein.

That is, the opening and closing door 52b is opened to allow the outside air passing through the evaporator 56 to be introduced into the heater 52a in the heating mode of the vehicle. In contrast, in the cooling mode of the vehicle, the opening and closing door 52b closes off the heater 52a such that the outside air which is cooled while passing through the evaporator 56 directly flows into the vehicle.

Herein, when the second coolant heater 43 is not provided in the heating apparatus 40, the air heater 45 provided in the HVAC module 52 may be provided at an opposite side of the evaporator 56 with the heater 52a interposed therebetween.

The air heater 45 may be operated to raise the temperature of the outside air flowing into the heater 52a when the temperature of the coolant supplied to the heater 52a is lower than a target temperature for internal heating.

On the other hand, the air heater 45 may be provided inside the HVAC module 52 when the second coolant heater 43 is not provided in the heating line 41.

That is, in the heat pump system according to various exemplary embodiments of the present invention, only one of the second coolant heater 43 and the air heater 45 may be applied.

In the exemplary embodiment of the present invention, the condenser 53 is connected to the refrigerant line 51 to allow the refrigerant to pass therethrough. The condenser 53 is provided on the heating line 41 between the second valve V2 and the heater 52a such that the coolant circulating the heating apparatus 40 passes through.

This condenser 53 may condense the refrigerant through heat exchange with the coolant circulating the heating line 41. That is, the condenser 53 may be a water-cooled heat exchanger into which the coolant flows.

The condenser 53 configured as described above may perform heat exchange between the refrigerant supplied from the compressor 59 and the coolant supplied from the heating apparatus 40 to condense the refrigerant.

In the exemplary embodiment of the present invention, the heat exchanger 54 may be provided in the refrigerant line 51 between the condenser 53 and the evaporator 56.

The first expansion valve 55 is provided in the refrigerant line 51 between the heat exchanger 54 and the evaporator 56. The first expansion valve 55 receives the refrigerant passing through the heat exchanger 54 to expand it.

The accumulator 57 is provided in the refrigerant line 51 between the evaporator 56 and the compressor, 59 and is connected to the refrigerant connection line 61.

Such the accumulator 57 improves the efficiency and durability of the compressor 59 by supplying only the gaseous refrigerant to the compressor 59.

In the exemplary embodiment of the present invention, the first end portion of the refrigerant connection line 61 is connected to the refrigerant line 51 between the heat exchanger 54 and the first expansion valve 55. The second end portion of the refrigerant connection line 61 may be connected to the accumulator 57.

Herein, the accumulator 57 may supply the gaseous refrigerant of the refrigerant supplied through the refrigerant connection line 61 to the compressor 59.

On the other hand, the refrigerant connection line 61 is provided with a second expansion valve 63, and the refrigerant line 51 between the condenser 53 and the heat exchanger 54 may be provided with a third expansion valve 65.

The second expansion valve 63 may expand the coolant inflowed through the refrigerant connection line 61 to inflow to the chiller 30 when cooling the battery module 24 with the refrigerant.

Herein, the second expansion valve 63 is operated when recovering the waste heat of the electrical component 15, or the battery module 26, in the heating mode, and heating and dehumidification mode of the vehicle.

The second expansion valve 63 may selectively expand the refrigerant introduced through the refrigerant connection line 61 to inflow the chiller 30.

That is, the second expansion valve 63 may introduce the refrigerant exhausted from the heat exchanger 54 into the chiller 30 in a state where the temperature of the refrigerant is reduced by expanding the refrigerant, to further reduce the temperature of the coolant passing through the interior of the chiller 30.

As a result, the coolant having the temperature which is reduced while passing through the chiller 30 is introduced into the battery module 24, being more efficiently cooled.

The third expansion valve 65 may selectively expand the refrigerant which is flowed into the heat exchanger 54 in the heating mode and a low temperature dehumidification mode of the vehicle.

Herein, the heat exchanger 54 may further condense or evaporate the refrigerant condensed from the condenser 53 through heat exchange with the outside air, depending on a selective operation of the third expansion valve 65.

In other words, the heat exchanger 54 is mounted in the front of the radiator 12 to mutually heat-exchange the coolant that has been inflowed therein with the outside air. The heat exchanger 54 may be an air-cooled heat exchanger for condensing the refrigerant by use of outside air.

Meanwhile, when the heat exchanger 54 condenses the refrigerant, the heat exchanger 54 may further condense the refrigerant which is condensed in the condenser 53 to increase sub cooling of the refrigerant, improving a coefficient of performance (COP), which is a coefficient of the cooling capacity relative to the power required by the compressor.

The compressor 59 is connected thereto between the evaporator 56 and the condenser 53 through the refrigerant line 51. This compressor 59 may compress the gaseous refrigerant and supply the compressed refrigerant to the condenser 53.

The first, second, and third expansion valves 55, 63, and 65 may be electronic expansion valves that selectively expand the coolant while controlling a flow of the refrigerant through the coolant line 51 or the refrigerant connection line 61.

Furthermore, the first valve V1 may be 6-Way valve, and the second valve V2 may be four-way valve.

Herein, a structure of the first valve V1 will be described in more detail with reference to FIG. 2.

In the exemplary embodiment of the present invention, the first valve V1 may include first, second, third, fourth, fifth, and sixth ports P1, P2, P3, P4, P5, and P6.

First, the first port P1 is connected to the coolant line 11 connected to the reservoir tank 16.

The second port P2 is connected to the coolant line 11 connected to the first water pump 14.

Herein, the supply line 17 may be connected to the coolant line 11 connecting the second port P2 and the first water pump 14.

The third port P3 is connected to the chiller connection line 31, and the fourth port P4 is connected to the branch line 18.

The fifth port P5 is connected to the battery coolant line 21 connected to the chiller 30 between the chiller 30 and the first valve V1. The sixth port P6 is connected to the battery coolant line 21 connected to the second water pump 22.

Herein, the first valve V1 may be operated to discharge the coolant through a port adjacent to the port into which the coolant is introduced among the first port, the second port, the third port, the fourth port, the fifth port and the sixth port P1, P2, P3, P4, P5, and P6.

For example, the coolant introduced into the first port P1 may be discharged through the second port P2 or the sixth port P6 mounted adjacent to the first port P1 according to the operation of the first valve V1.

That is, the first valve V1 to is configured to simplify the structure, and for convenience of valve control, when two ports adjacent to each other are closed, remaining four ports are opened so that two ports adjacent to each other are connected to each other, controlling the flow of the coolant.

Hereinafter, an operation and function of the heat pump system for the vehicle according to various exemplary embodiments of the present invention configured as described above will be described in detail with reference to FIG. 3 to FIG. 9.

First, an operation of a case of cooling the electrical component 15 and the battery module 24 using the radiator 12 in the heat pump system for the vehicle according to the exemplary embodiment of the present invention will be described with reference to FIG. 3.

Figure 3:
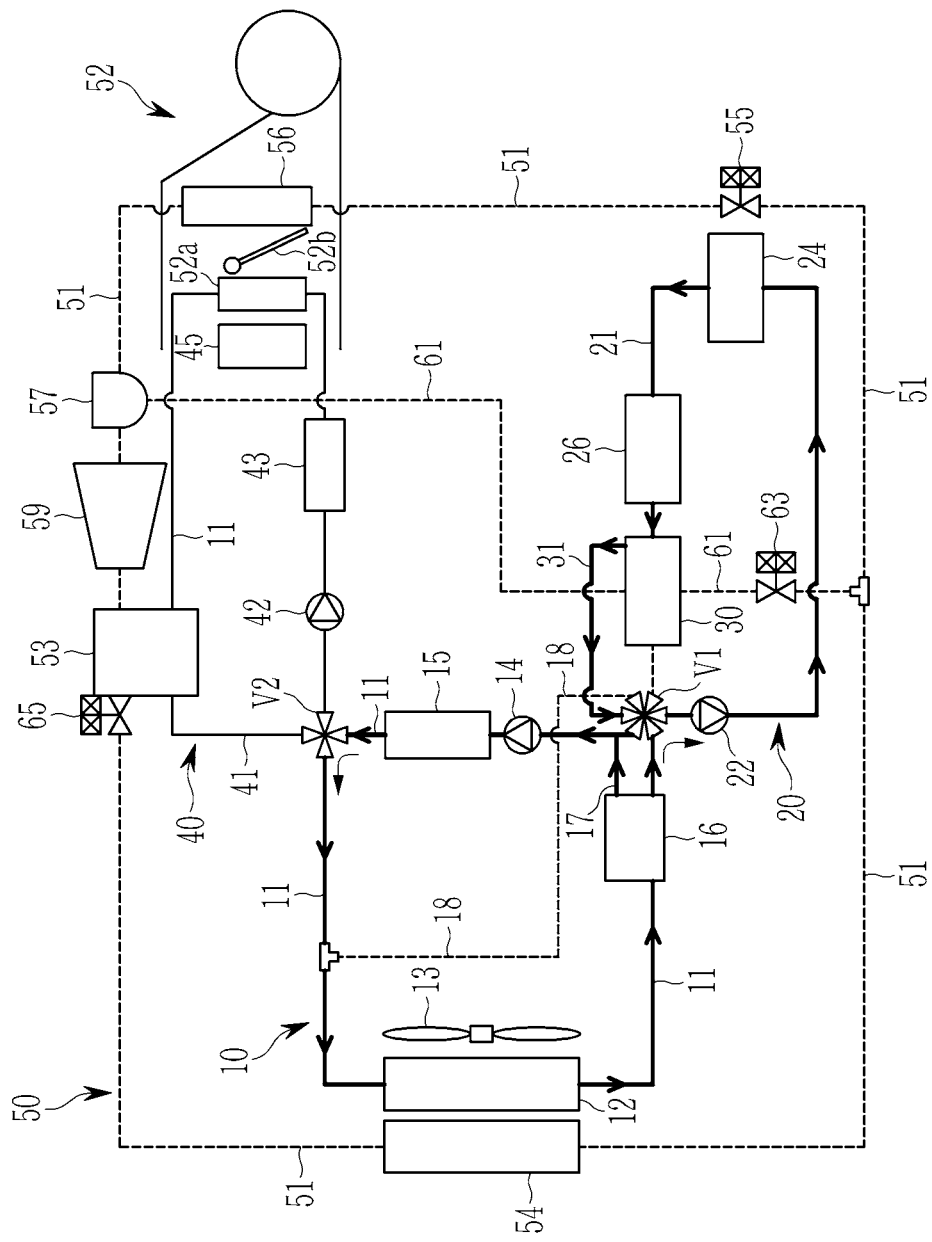
FIG. 3 illustrates an operational state diagram for cooling electrical components and a battery module by use of a radiator in the heat pump system for a vehicle according to various exemplary embodiments of the present invention.

FIG. 3 illustrates an operational state diagram for cooling electrical components and a battery module by use of a radiator in the heat pump system for a vehicle according to various exemplary embodiments of the present invention.

Referring to FIG. 3, the branch line 18 is closed through operation of the first valve V1. The chiller connection line 31 is opened through operation of the first valve V1.

The supply line 17 is opened. That is, a portion of the coolant stored in the reservoir tank 16 may be circulated along the coolant line 11 through the opened supply line 17.

Herein, a portion of the battery coolant line 21 connecting the chiller 30 and the first valve V1 through operation of the first valve V1 is closed.

Furthermore, the battery coolant line 21 is connected to the coolant line 11 by the operation of the first valve V1.

The coolant line 11 connecting the reservoir tank 16 and the first valve V1 is connected to the battery coolant line 21 through operation of the first valve V1.

In the present state, in the cooling apparatus 10, the first water pump 14 is operated to cool the electrical component 15.

In the battery cooling apparatus 20, the second water pump 22 is operated to cool the battery module 24.

Accordingly, the coolant which is cooled in the radiator 12 and stored in the reservoir tank 16 is supplied to the battery module 24, while circulating through the battery coolant line 21 by operations of the first valve V1 and the second water pump 22.

That is, the coolant introduced into the first valve V1 from the reservoir tank 16 through the first port P1 is introduced into the battery coolant line 21 through the sixth port P6.

The coolant introduced into the battery coolant line 21 passes through the battery module 24 and is introduced into the chiller 30.

Accordingly, the coolant passing through the battery module 24 is introduced from the chiller 30 to the first valve V1 along the opened chiller connection line 31. Thereafter, the coolant may be supplied to the electrical component 15 while flowing along the coolant line 11 connected to the first water pump 14 by the operation of the first water pump 14.

That is, the coolant discharged from the chiller 30 is introduced into the third port P3 of the first valve V1 along the opened chiller connection line 31, and is discharged to the coolant line 11 connected to the first water pump 14 through the second port P2.

Herein, a portion of the coolant stored in the reservoir tank 16 may be circulated along the coolant line 11 through the opened supply line 17.

That is, the coolant cooled in the radiator 12 and stored in the reservoir tank 16 circulates through the coolant line 11 and the battery coolant line 21 by the operations of the first and second water pumps 14 and 22, respectively, to efficiently cool the electrical component 15 and the battery module 24.

The air conditioner 50 is not operated because the cooling mode of the vehicle is deactivated.

On the other hand, although it has been described in the exemplary embodiment of the present invention that both of the electrical component 15 and the battery module 24 are cooled, the present invention is not limited thereto, and when one of the electrical component 15 and the battery module 24 is separately cooled, the first and second water pumps 14 and 22, and the first valve V1 may be selectively operated.

An operation of the case of cooling the battery module 24 in the cooling mode of the vehicle will be described with respect to FIG. 4.

Figure 4:
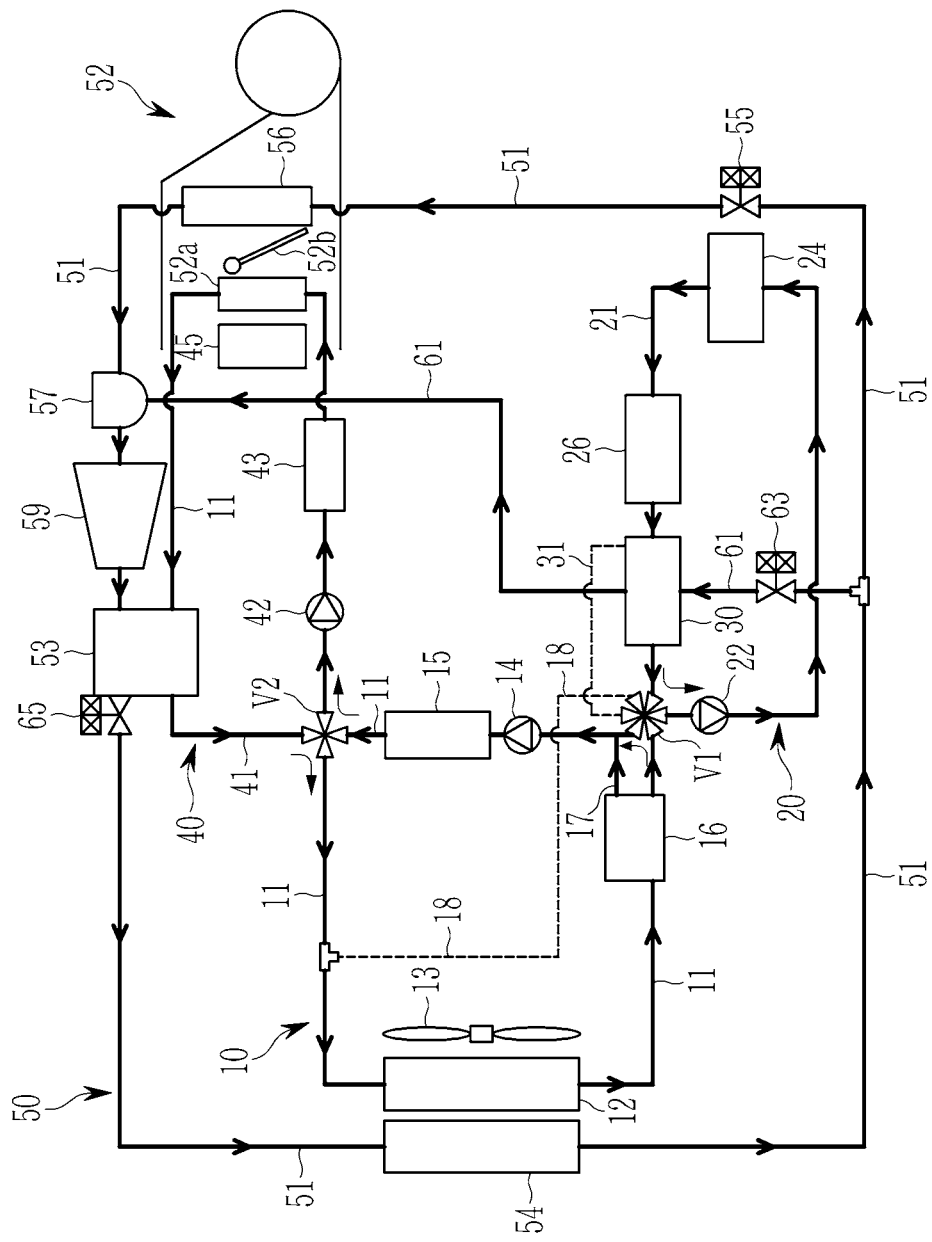
FIG. 4 illustrates an operational state diagram for cooling a battery module by use of a refrigerant in a cooling mode of a vehicle in the heat pump system for a vehicle according to various exemplary embodiments of the present invention.

FIG. 4 illustrates an operational state diagram for cooling a battery module by use of a refrigerant in a cooling mode of a vehicle in the heat pump system for a vehicle according to various exemplary embodiments of the present invention.

Referring to FIG. 4, in the cooling apparatus 10, the coolant is circulated in the coolant line 11 by the operation of the first water pump 14. At the same time, the supply line 17 is opened.

That is, a portion of the coolant stored in the reservoir tank 16 may be circulated along the coolant line 11 through the opened supply line 17.

Herein, the branch line 18 and the chiller connection line 31 are closed through operation of the first valve V1.

Accordingly, the coolant introduced into the first valve V1 from the reservoir tank 16 through the first port P1 may be introduced into the coolant line 11 through the second port P2.

In the battery cooling apparatus 20, the second water pump 22 is operated to cool the battery module 24.

Accordingly, in the battery cooling apparatus 20, the coolant may be circulated in the battery coolant line 21 by the operation of the second water pump 22.

Herein, the cooling apparatus 10 and the battery cooling apparatus 20 may form an independent closed circuit through which each coolant is separately circulated by the operation of the first valve V1.

That is, the battery cooling apparatus 20 is not connected to the coolant line 11 by the operation of the first valve V1.

In the present state, the battery cooling apparatus 20 may form a closed circuit through which the coolant is independently circulated in the battery coolant line 21 by operation of the second water pump 22.

That is, the coolant line 11 and the battery coolant line 21 form independent closed circuits through operation of the first valve V1, respectively.

Accordingly, in the battery cooling apparatus 20, the coolant passing through the chiller 30 may be supplied to the battery module 24 along the battery coolant line 21 through operation of the second water pump 22.

The coolant introduced into the battery coolant line 21 is passed through the battery module 24 and is introduced into the chiller 30.

Accordingly, the coolant passing through the battery module 24 is introduced from the chiller 30 to the first valve V1 along the opened battery coolant line 21. Thereafter, the coolant may be supplied to the battery module 24 while flowing along the battery coolant line 21 by the operation of the second water pump 22.

That is, the coolant discharged from the chiller 30 is introduced into the fifth port P5 of the first valve V1 along the battery coolant line 21, and is discharged to the battery coolant line 21 connected to the second water pump 22 through the sixth port P6.

Meanwhile, in the heating apparatus 40, the heating line 41 is connected to the coolant line 11 through operation of the second valve V2.

In the present state, the coolant supplied from the cooling apparatus 10 is circulated in the heating line 41 through operation of the third water pump 42.

Accordingly, the coolant cooled in the radiator 12 may be supplied to the condenser 53 through operation of the first and third water pump 14 and 42, after passing through the electrical component 15.

In the air conditioner 50, each constituent element operates to cool the interior of the vehicle. Accordingly, the refrigerant is circulated along the refrigerant line 51.

Herein, the refrigerant line 51 connecting the heat exchanger 54 and the evaporator 56 is opened through operation of the first expansion valve 55. The refrigerant connection line 61 is opened through operation of the second expansion valve 63.

Accordingly, the refrigerant having passed through the heat exchanger 54 may be circulated along the refrigerant line 51 and the refrigerant connection line 61.

Herein, the first and second expansion valves 55 and 63 may expand the refrigerant such that the expanded refrigerant is supplied to the evaporator 56 and the chiller 30, respectively. The third expansion valve 65 may inflow the refrigerant supplied from the condenser 53 to the heat exchanger 54 without expanding.

Meanwhile, the heating apparatus 40 supplies the coolant supplied from the cooling apparatus 10 to the condenser 53 through operation of the third water pump 42.

The condenser 53 condenses the refrigerant by use of the coolant flowing along the heating line 41. Also, the heat exchanger 54 may further condense the refrigerant introduced from the condenser 53 through operation of the third expansion valve 65 through heat exchange with the outside air.

The coolant passing through the chiller 30 is circulated in the battery coolant line 21 to cool the battery module 24 through operation of the second water pump 22.

The coolant passing through the chiller 30 is cooled through heat exchange with the expanded refrigerant which is supplied to the chiller 30. The coolant cooled in the chiller 30 is supplied to the battery module 24. Accordingly, the battery module 24 is cooled by the cooled coolant.

That is, the second expansion valve 63 expands some of the coolant through the heat exchanger 54 to supply the expanded coolant to the chiller 30, and opens the refrigerant connection line 61.

Accordingly, the refrigerant discharged from the heat exchanger 54 is expanded to enter a low-temperature and low-pressure state through operation of the second expansion valve 63, and flows into the chiller 30 connected to the refrigerant connection line 61.

Thereafter, the refrigerant flowing into the chiller 30 is performed heat exchange with the coolant, and then is introduced into the compressor 59 after passing through the accumulator 57 through the refrigerant connection line 61.

In other words, the coolant with the increased temperature from cooling the battery module 24 is cooled through heat exchange with the low temperature low pressure refrigerant inside the chiller 30. The cooled coolant is again supplied to the battery module 24 through the battery coolant line 21.

That is, the coolant may efficiently cool the battery module 24 while repeating the above-described operation.

On the other hand, the remaining refrigerant discharged from the heat exchanger 54 flows through the refrigerant line 51 to cool the interior of the vehicle, and sequentially passes through the first expansion valve 55, the evaporator 56, the compressor 59, and the condenser 53.

Herein, the outside air flowing into the HVAC module 52 is cooled while passing through the evaporator 56 by the low-temperature refrigerant flowing into the evaporator 56.

In the instant case, a portion of the heater 52*a* through which the cooled outside air passes is closed by the opening and closing door 52*b* such that the outside air does not pass through the heater 52*a*. Accordingly, the cooled outside air directly flows into the interior of the vehicle, cooling the vehicle interior.

On the other hand, the coolant having an amount of condensation which is increased while sequentially passing through the condenser 53 and the heat exchanger 54 may be expanded and supplied to the evaporator 56, allowing the refrigerant to be evaporated to a lower temperature.

As a result, in the exemplary embodiment of the present invention, the condenser 53 condenses the refrigerant, and the heat exchanger 54 further condenses the refrigerant, which is advantageous in forming the sub-cooling of the refrigerant.

Furthermore, as the sub-cooled refrigerant may be evaporated to a lower temperature in the evaporator 56, the temperature of the outside air passing through the evaporator 56 may be further lowered, improving cooling performance and efficiency.

The refrigerant may cool the interior of the vehicle in the cooling mode of the vehicle while repeating the above-described processes, and at the same time, may cool the coolant through the heat exchange while passing through the chiller 30.

The low-temperature coolant cooled in the chiller 30 is introduced into the battery module 24. Accordingly, the battery module 24 may be efficiently cooled by the low-temperature coolant supplied therefrom.

In the exemplary embodiment of the present invention, the operation for the case of recovering the waste heat of the external heat source and the electrical component 15 in the heating mode of the vehicle is described with reference to FIG. 5.

Figure 5:
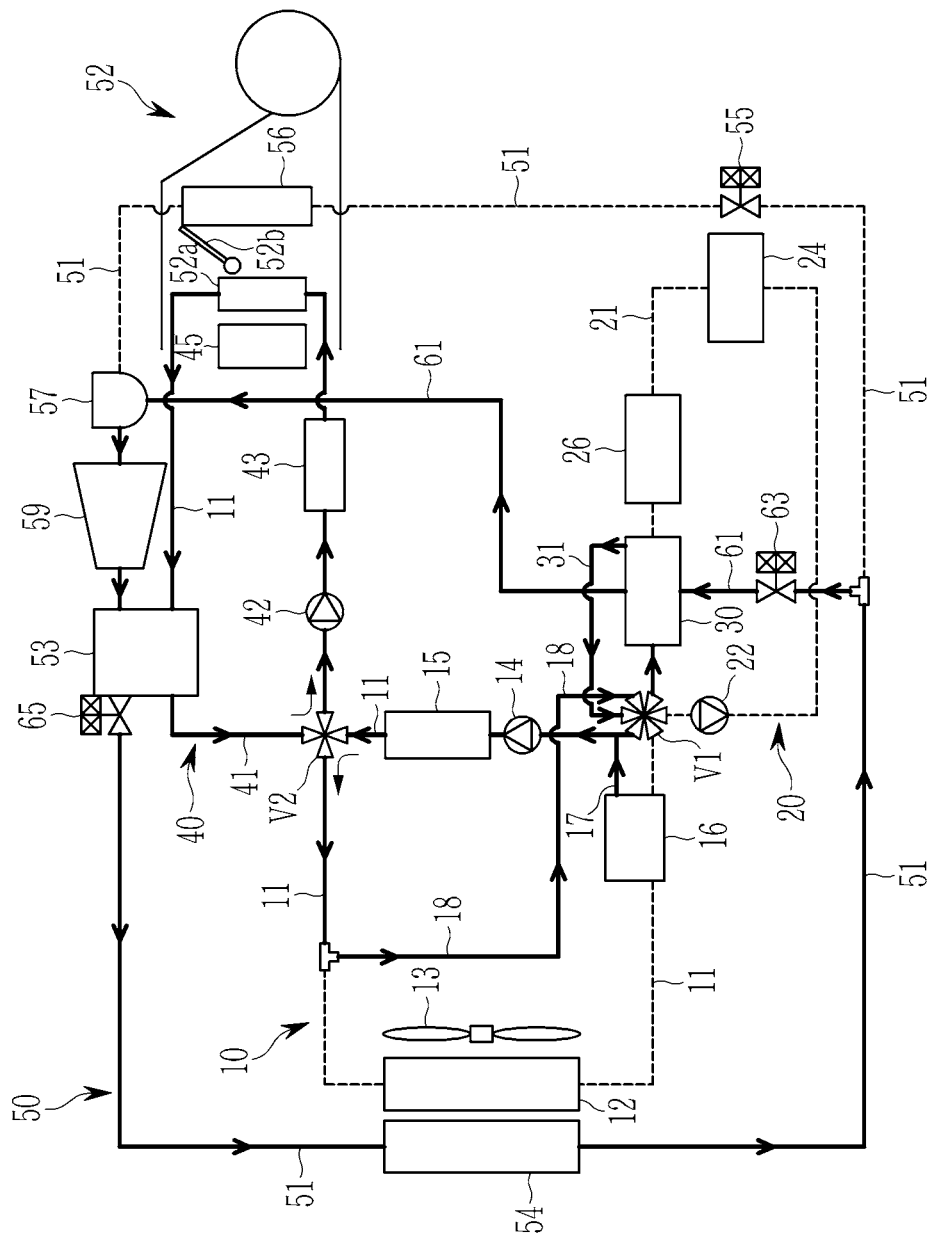
FIG. 5 illustrates an operational state diagram for waste heat recovery of external heat and an electrical component depending on a heating mode in a heat pump system for a vehicle according to various exemplary embodiments of the present invention.

FIG. 5 illustrates an operational state diagram for waste heat recovery of external heat and an electrical component depending on a heating mode in a heat pump system for a vehicle according to various exemplary embodiments of the present invention.

Referring to FIG. 5, the heat pump system may absorb the external heat from the outside air along with the waste heat of the electrical component 15 in an initial starting idle state IDLE of the vehicle or in a during initial driving state where the waste heat of the electrical component 15 is insufficient.

First, in the cooling apparatus 10, the first water pump 14 is operated for circulation of the coolant. The supply line 17 is opened.

Thus, a portion of the coolant stored in the reservoir tank 16 may be circulated along the coolant line 11 through the opened supply line 17.

Herein, the branch line 18 and the chiller connection line 31 are opened through operation of the first valve V1.

Accordingly, on the basis of the branch line 18, a portion of the coolant line 11 connected to the radiator 12 and a portion of the coolant line 11 connecting the radiator 12 and the reservoir tank 16 are closed through operation of the first valve V1.

In the present state, the coolant passing through the electrical component 15 may circulate along the opened branch line 18 and an opened portion of the coolant line 11 without passage through the radiator 12 through operation of the first water pump 14.

Herein, the coolant introduced into the first valve V1 through the branch line 18 may be introduced into the chiller 30 along a portion of the battery coolant line 21 connecting the chiller 30 and the first valve V1.

The coolant passing through the chiller 30 is introduced into the first valve V1 along the opened chiller connection line 31. Thereafter, the coolant is circulated in the coolant line 11 connected to the electrical component 15 through the first valve V1.

Meanwhile, in the battery cooling apparatus 20, the second water pump 22 is deactivated.

Thus, the coolant passing through the electrical component 15 continuously circulates along the coolant line 11, the branch line 18, an opened portion of the battery coolant line 21, and the chiller connection line 31 without passing through the radiator 12, and absorbs the waste heat from the electrical component 15 such that the temperature is increased.

The coolant with the increased temperature may be supplied to the chiller 30 provided at the battery coolant line 21. That is, the waste heat generated by the electrical component 15 raises the temperature of the coolant supplied to the chiller 30.

The coolant introduced from the branch line 18 to the first valve V1 through the fourth port P4 is introduced into the battery coolant line 21 connected to the chiller 30 through the fifth port P5.

Thereafter, the coolant passing through the chiller 30 is introduced into the third port P3 of the first valve V1 along the opened chiller connection line 31. The coolant introduced into the third port P3 is discharged to the coolant line 11 connected to the first water pump 14 through the second port P2 connected to the third port P3.

While repeatedly performing such an operation, the coolant absorbs the waste heat from the electric component 15 and may increase the temperature.

Meanwhile, in the heating apparatus 40, the coolant circulates along the heating line 41 through operation of the third water pump 42.

The coolant line 11 and the heating line 41 may form the independent closed circuit through operation of the second valve V2, respectively.

Thus, the coolant circulating through the heating line 41 may be supplied to the condenser 53 after passing through the heater 52*a* through operation of the third water pump 42.

Herein, the second coolant heater 43 is operated when the temperature of the coolant circulating along the heating line 41 is lower than the target temperature, so that the coolant circulating in the heating line 41 may be heated.

On the other hand, when the air heater 45 is applied instead of the second coolant heater 43, the air heater 45 operates when the temperature of the outside air passing through the heater 52*a* is lower than the target temperature, and the outside air introduced into the interior of the vehicle may be heated.

In the air conditioner 50, each constituent element operates to heat the vehicle interior. Thus, the refrigerant circulates along the refrigerant line 51.

Herein, the refrigerant line 51 connecting the condenser 53 and the evaporator 56 is closed through operation of the first expansion valve 55.

The refrigerant connection line 61 is opened through operation of the second expansion valve 63.

Herein, the second expansion valve 63 may supply the refrigerant to the chiller 30 by expanding the refrigerant supplied from the heat exchanger 54 to the refrigerant connection line 61.

The third expansion valve 65 may also supply the refrigerant to the heat exchanger 54 by expanding the refrigerant supplied from the condenser 53.

Thus, the heat exchanger 54 recovers the external heat while evaporating the expanded refrigerant through heat exchange with the outside air.

The coolant, which absorbs the waste heat of the electrical component 15 is increased in temperature, is recovered by increasing the temperature of the refrigerant supplied to the chiller 30 while passing through the chiller 30 through operation of the first water pump 14.

That is, the chiller 30 receives the refrigerant supplied from the heat exchanger 54 and expanded through operation of the second expansion valve 63 through the refrigerant connection line 61, and evaporates the supplied refrigerant through heat exchange with the coolant of which the temperature is increased while passing through the electrical component 15, recovering the waste heat of the electrical component 15.

Thereafter, the refrigerant passing through the chiller 30 is supplied to the accumulator 57 along the refrigerant connection line 61.

The refrigerant supplied to the accumulator 57 is separated into gas and liquid. of the refrigerant separated by gas and liquid, the gaseous refrigerant is supplied to the compressor 59.

The refrigerant compressed with the high temperature high pressure from the compressor 59 inflows to the condenser 53.

Herein, the refrigerant supplied to the condenser 53 may increase the temperature of the coolant by exchanging heat with the coolant circulating through the heating line 41. The coolant with raised temperature is supplied to the heater 52a.

Meanwhile, the opening and closing door 52b is opened so that the outside air introduced into the HVAC module 52 and passing through the evaporator 56 passes through the heater 52a.

As a result, the outside air inflow from the outside thereof flows into the internal in an uncooled temperature state when passing through the evaporator 56, which is not supplied with the refrigerant. The introduced outside air is converted to a high temperature state while passing through the heater 52a to be introduced into the interior of the vehicle, realizing the heating of the interior of the vehicle.

That is, the heat pump system according to the exemplary embodiment of the present invention absorbs the external heat from the heat exchanger 54 when the heating is required in the initial starting idle state (IDLE) of the vehicle or the during initial driving state and is used to increase the temperature of the refrigerant by use of the waste heat of the electrical component 15, reducing the power consumption of the compressor 59 and improving the cooling efficiency.

In the exemplary embodiment of the present invention, the operation for the case of recovering the waste heat of the external heat source and the battery module 24 in the heating mode of the vehicle is described with reference to FIG. 6.

Figure 6:
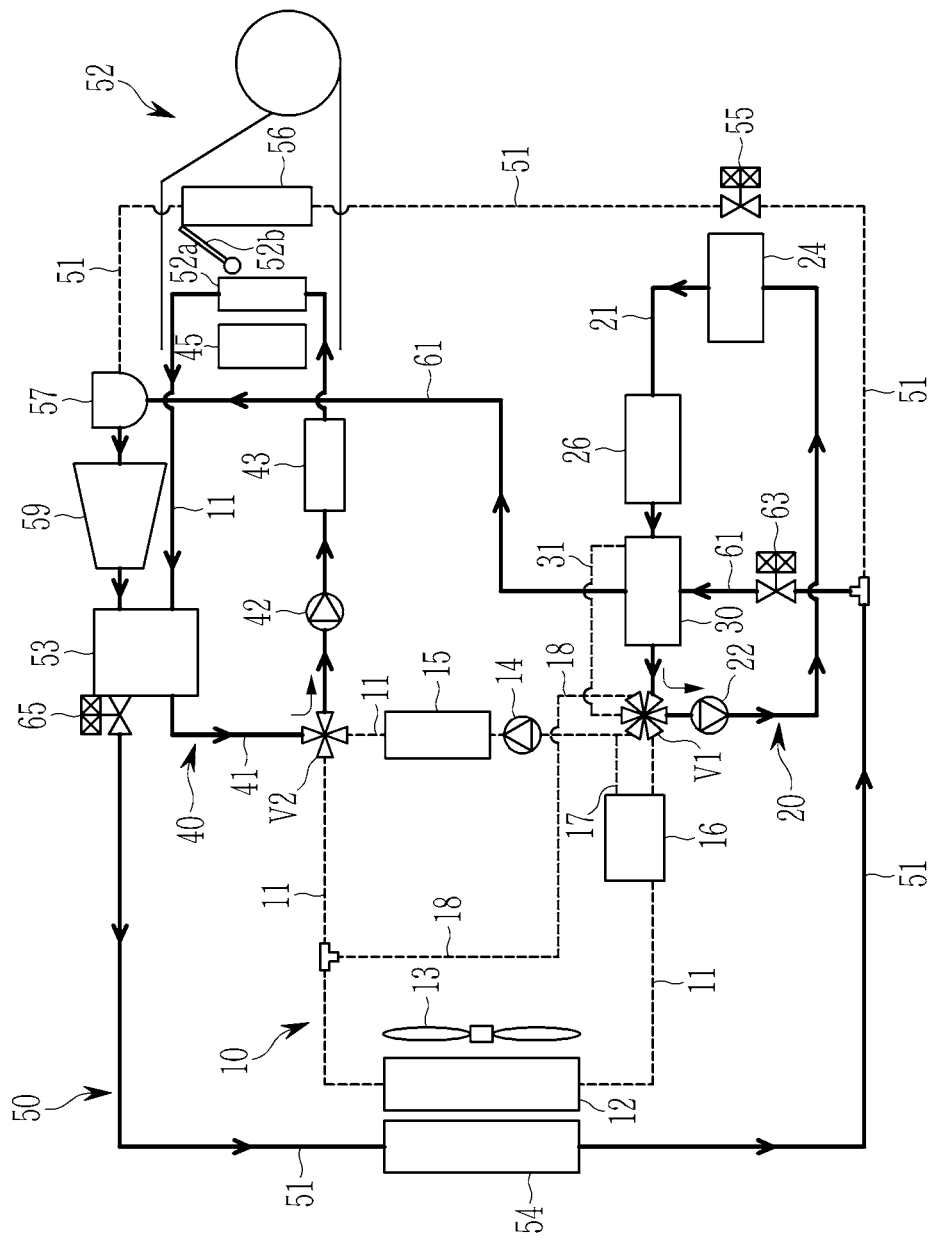
FIG. 6 illustrates an operational state diagram for waste heat recovery of external heat and a battery module depending on a heating mode in a heat pump system for a vehicle according to various exemplary embodiments of the present invention.

FIG. 6 illustrates an operational state diagram for waste heat recovery of external heat and a battery module depending on a heating mode in a heat pump system for a vehicle according to various exemplary embodiments of the present invention.

Referring to FIG. 6, the heat pump system may absorb the external heat from the outside air along with the waste heat of the battery module 24 in an initial starting idle state IDLE of the vehicle or in a during initial driving state where the waste heat of the electrical component 15 is insufficient.

First, the cooling apparatus 10 is deactivated.

Furthermore, the branch line 18 and the chiller connection line 31 are closed through operation of the first valve V1, and the supply line 17 is closed.

In the battery cooling apparatus 20, the battery coolant line 21 is not connected to the coolant line 11 through operation of the first valve V1.

In the present state, the second water pump 22 is operated to circulate the coolant through the battery coolant line 21. Accordingly, the coolant passing through the battery module 24 is supplied to the chiller 30.

Herein, the coolant passing through the chiller 30 is introduced into the third port P3 of the first valve V1 along the battery coolant line 21. Thereafter, the coolant is introduced into the battery coolant line 21 connected to the second water pump 22 through the sixth port P6 connected to the third port P3.

That is, the coolant passing through the battery module 24 may circulate the battery coolant line 21 through operation of the second water pump 22.

Accordingly, the coolant circulating along the battery coolant line 21 absorbs the waste heat from the battery module 24 and may increase the temperature.

The coolant with the increased temperature may be supplied to the chiller 30 provided at the battery coolant line 21. That is, the waste heat generated by the battery module 24 raises the temperature of the coolant supplied to the chiller 30.

Meanwhile, in the heating apparatus 40, the coolant circulates along the heating line 41 through operation of the third water pump 42.

Herein, the heating line 41 is not connected to the coolant line 11 through operation of the second valve V2.

Thus, the coolant circulating through the heating line 41 may be supplied to the condenser 53 after passing through the heater 52a through operation of the third water pump 42.

Herein, the second coolant heater 43 is operated when the temperature of the coolant circulating along the heating line 41 is lower than the target temperature, so that the coolant circulating in the heating line 41 may be heated.

On the other hand, when the air heater 45 is applied instead of the second coolant heater 43, the air heater 45 operates when the temperature of the outside air passing through the heater 52a is lower than the target temperature, and the outside air introduced into the interior of the vehicle may be heated.

In the air conditioner 50, each constituent element operates to heat the vehicle interior. Thus, the refrigerant circulates along the refrigerant line 51.

Herein, the refrigerant line 51 connecting the condenser 53 and the evaporator 56 is closed through operation of the first expansion valve 55.

The refrigerant connection line 61 is opened through operation of the second expansion valve 63.

Herein, the second expansion valve 63 may supply the refrigerant to the chiller 30 by expanding the refrigerant supplied from the heat exchanger 54 to the refrigerant connection line 61.

The third expansion valve 65 may also supply the refrigerant to the heat exchanger 54 by expanding the refrigerant supplied from the condenser 53.

Thus, the heat exchanger 54 recovers the external heat while evaporating the expanded refrigerant through heat exchange with the outside air.

The coolant, which absorbs the waste heat of the battery module 24 is increased in temperature, is recovered by increasing the temperature of the refrigerant supplied to the chiller 30 while passing through the chiller 30 through operation of the second water pump 22.

That is, the chiller 30 receives the refrigerant supplied from the heat exchanger 54 and expanded through operation of the second expansion valve 63 through the refrigerant connection line 61, and evaporates the supplied refrigerant through heat exchange with the coolant of which the temperature is increased while passing through the battery module 24, recovering the waste heat of the battery module 24.

Thereafter, the refrigerant passing through the chiller 30 is supplied to the accumulator 57 along the refrigerant connection line 61.

The refrigerant supplied to the accumulator 57 is separated into gas and liquid. of the refrigerant separated by gas and liquid, the gaseous refrigerant is supplied to the compressor 59.

The refrigerant compressed with the high temperature high pressure from the compressor 59 inflows to the condenser 53.

Herein, the refrigerant supplied to the condenser 53 may increase the temperature of the coolant by exchanging heat with the coolant circulating through the heating line 41. The coolant with raised temperature is supplied to the heater 52a.

Meanwhile, the opening and closing door 52b is opened so that the outside air flowing into the HVAC module 52 and passing through the evaporator 56 passes through the heater 52a.

As a result, the outside air inflow from the outside thereof flows into the internal in an uncooled temperature state when passing through the evaporator 56, which is not supplied with the refrigerant. The introduced outside air is converted to a high temperature state while passing through the heater 52a to be introduced into the interior of the vehicle, realizing the heating of the interior of the vehicle.

That is, the heat pump system according to the exemplary embodiment of the present invention absorbs the external heat from the heat exchanger 54 when the heating is required in the initial starting idle state (IDLE) of the vehicle or the during initial driving state and is used to increase the temperature of the refrigerant by use of the waste heat of the battery module 24, reducing the power consumption of the compressor 59 and improving the cooling efficiency.

In the exemplary embodiment of the present invention, an operation of the case of using the waste heat of the electrical component 15 without operating the air conditioner 50 in the heating mode of the vehicle will be described with reference to FIG. 7.

Figure 7:
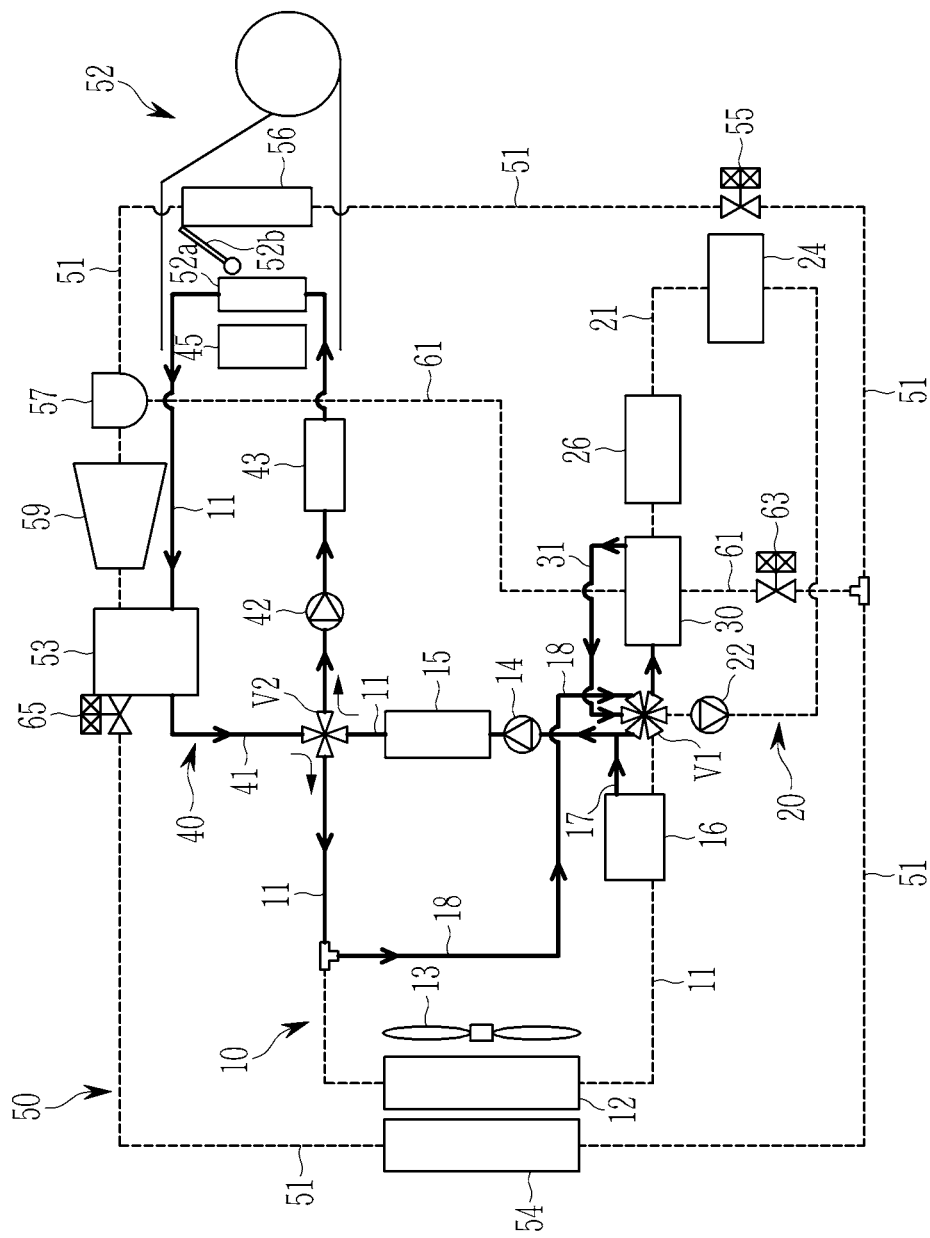
FIG. 7 illustrates an operational state diagram for performing the heating mode using waste heat of an electrical component in a heat pump system for a vehicle according to various exemplary embodiments of the present invention.

FIG. 7 illustrates an operational state diagram for performing the heating mode using waste heat of an electrical component in a heat pump system for a vehicle according to various exemplary embodiments of the present invention.

Referring to FIG. 7, the heat pump system may perform heating the interior of the vehicle by use of waste heat from the electrical component 15 without operating the air conditioner 50.

First, in the cooling apparatus 10, the first water pump 14 is operated for circulation of the coolant. In the instant case, the air conditioner 50 is deactivated.

Herein, the branch line 18 and the chiller connection line 31 are opened through operation of the first valve V1. The supply line 17 is opened.

Thus, a portion of the coolant stored in the reservoir tank 16 may be circulated along the coolant line 11 through the opened supply line 17.

Accordingly, on the basis of the branch line 18, a portion of the coolant line 11 connected to the radiator 12 and a portion of the coolant line 11 connecting the radiator 12 and the reservoir tank 16 are closed through operation of the first valve V1.

That is, on the basis of the branch line 18, the portion of the coolant line 11 connected to the radiator 12, the reservoir tank 16, and the first valve V1 may be closed.

Furthermore, the battery coolant line 21 except for the battery coolant line 21 connected to the chiller 30 is closed through operation of the first valve V1.

In the present state, the coolant passing through the electrical component 15 may circulate along the opened branch line 18 and an opened portion of the coolant line 11 without passage through the radiator 12 through operation of the first water pump 14.

Herein, the coolant introduced into the first valve V1 through the branch line 18 may be introduced into the chiller 30 along a portion of the battery coolant line 21 connecting the chiller 30 and the first valve V1.

The coolant passing through the chiller 30 is introduced into the first valve V1 along the opened chiller connection line 31. Thereafter, the coolant is circulated in the coolant line 11 connected to the electrical component 15 through the first valve V1.

Meanwhile, in the battery cooling apparatus 20, the second water pump 22 is deactivated.

That is, the battery coolant line 21 connecting the second water pump 22 and the battery module 24 is closed, and the operation of the battery cooling apparatus 20 is deactivated.

Thus, the coolant passing through the electrical component 15 continuously circulates along the coolant line 11, the branch line 18, an opened portion of the battery coolant line 21, and the chiller connection line 31 without passing through the radiator 12, and absorbs the waste heat from the electrical component 15 such that the temperature is increased.

That is, the coolant introduced from the branch line 18 to the first valve V1 through the fourth port P4 is introduced into the battery coolant line 21 connected to the chiller through the fifth port P5.

Thereafter, the coolant passing through the chiller 30 is introduced into the third port P3 of the first valve V1 along the opened chiller connection line 31. The coolant introduced into the third port P3 is discharged to the coolant line 11 connected to the first water pump 14 through the second port P2 connected to the third port P3.

While repeatedly performing such an operation, the coolant absorbs the waste heat from the electric component 15 and may increase the temperature.

In the heating apparatus 40, the heating line 41 is connected to the coolant line 11 through operation of the second valve V2.

In the present state, the coolant having the temperature that has risen while passing through the electrical component 15 by the operation of the first water pump 14 is supplied to the heating line 41 connected to the opened coolant line 11 without passing through the radiator 12.

The coolant introduced into the heating line 41 may be supplied to the heater 52a through operation of the third water pump 42.

The coolant discharged from the heater 52*a* passes through the second valve V2 and is introduced into the first valve V1 along the opened portion of the coolant line 11 and the opened branch line 18.

The coolant introduced into the first valve V1 is again introduced into the first valve V1 along the opened chiller connection line 31 after passing through the chiller 30 along the opened portion of the battery coolant line 21.

The coolant again introduced into the first valve V1 is supplied to the electrical component 15 along the opened the coolant line 11.

That is, the coolant that has passed through the electrical component 15 continues to circulate along the opened coolant line 11, the branch line 18, the opened portion of the battery coolant line 21, and the chiller connection lines 31 without passing through the radiator 12, and absorbs the waste heat from the electric component 15 such that the temperature thereof increases.

The coolant having the temperature that has been raised is introduced into the heating line 41 connected to the coolant line 11 without passing through the radiator 12.

The coolant introduced into the heating line 41 may pass through the heater 52*a* through operation of the third water pump 42.

Herein, the second coolant heater 43 is operated when the temperature of the coolant circulating along the heating line 41 is lower than the target temperature, so that the coolant circulating in the heating line 41 may be heated.

On the other hand, when the air heater 45 is applied instead of the second coolant heater 43, the air heater 45 may be selectively operated depending on the temperature of the outside air passing through the heater 52*a*.

That is, the air heater 45 may be operated when the temperature of the outside air passing through the heater 52*a* is lower than a target temperature, heating the outside air flowing into the interior of the vehicle.

The air heater 45 is operated when the temperature of the outside air that has completed heat exchange with the high-temperature coolant while passing through the heater 52*a* is lower than a predetermined temperature or a target heating temperature.

When the air heater 45 is operated, the outside air may be heated while passing through the air heater 45, to be introduced into the vehicle interior in a state where the temperature is raised.

Meanwhile, the high-temperature coolant supplied to the heater 52*a* performs heat exchange with the outside air, and then is introduced into a portion of the coolant line 11 connected to the heating line 41 through the second valve V2.

Thereafter, the coolant is introduced into the first valve V1 along the opened branch line 18 without passing through the radiator 12.

The coolant introduced into the first valve V1 sequentially passes the opened battery coolant line 21, the chiller 30, and the chiller connection line 31, and is again introduced into the coolant line 11 connected to the electrical component 15.

Meanwhile, the opening and closing door 52*b* is opened such that the outside air flowing into the HVAC module 52 passes through the heater 52*a*.

As a result, the outside air inflow from the outside thereof flows into the internal in an uncooled temperature state when passing through the evaporator 56, which is not supplied with the refrigerant. The introduced outside air is converted to a high temperature state while passing through the heater 52*a* to be introduced into the interior of the vehicle, realizing the heating of the interior of the vehicle.

In other words, according to various exemplary embodiments of the present invention, it is possible to recover the waste heat generated in the electrical component 15 while repeating the above-described process, and use the waste heat for internal heating, reducing power consumption and improving overall heating efficiency.

In the exemplary embodiment of the present invention, an operation of the case of using the waste heat of the electrical component 15 without operating the air conditioner 50 and the cooling of the electrical component 15 is required in the heating mode of the vehicle will be described with reference to FIG. 8.

Figure 8:
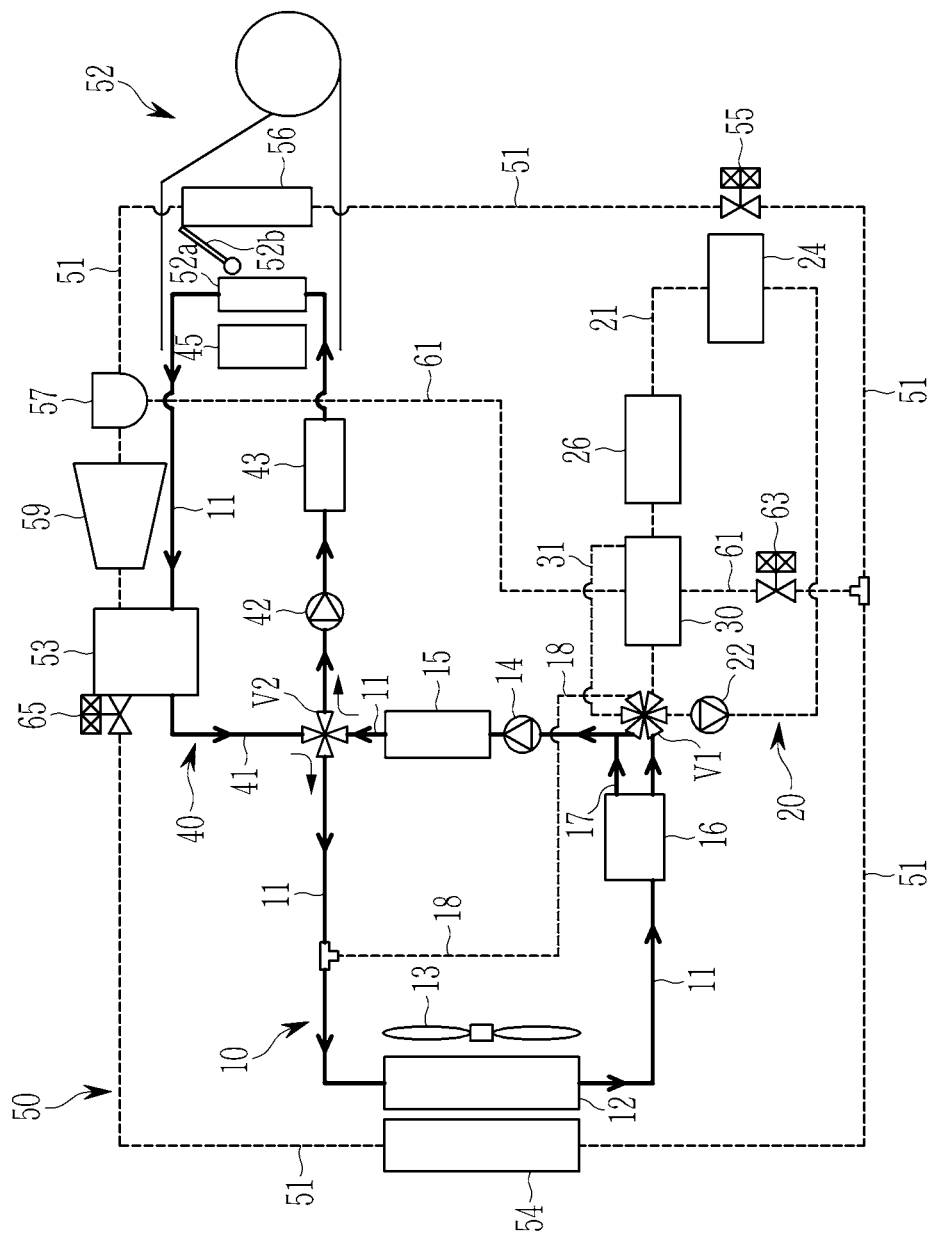
FIG. 8 illustrates an operational state diagram for cooling an electrical component while performing the heating mode using waste heat of the electrical component in a heat pump system for a vehicle according to various exemplary embodiments of the present invention.

FIG. 8 illustrates an operational state diagram for cooling an electrical component while performing the heating mode using waste heat of the electrical component in a heat pump system for a vehicle according to various exemplary embodiments of the present invention.

Referring to FIG. 8, the heat pump system may perform heating the interior of the vehicle by use of waste heat from the electrical component 15 without operating the air conditioner 50, and cool the electrical component 15 at same time.

Referring to FIG. 8, in the cooling apparatus 10, the first water pump 14 is operated for circulation of the coolant.

Herein, the branch line 18 and the chiller connection line 31 are closed through operation of the first valve V1. The supply line 17 is opened.

Thus, a portion of the coolant stored in the reservoir tank 16 may be circulated along the coolant line 11 through the opened supply line 17.

The battery coolant line 21 connecting the second water pump 22 and the battery module 24 is closed, and the operation of the battery cooling apparatus 20 is deactivated.

Meanwhile, in the heating apparatus 40, the heating line 41 is connected to the coolant line 11 through operation of the second valve V2.

In the present state, the coolant having the temperature that has risen while passing through the electrical component 15 by the operation of the first water pump 14 is supplied to the heating line 41 connected to the opened coolant line 11.

The coolant introduced into the heating line 41 may be supplied to the heater 52*a* through operation of the third water pump 42.

The coolant discharged from the heater 52*a* is introduced into the opened coolant line 11 through the second valve V2.

Thereafter, the coolant introduced into the coolant line 11 is cooled while passing through the radiator 12, and is again introduced into the electrical component 15 along the coolant line 11 through operation of the first water pump 14.

That is, the coolant passing through the electrical component 15 absorbs the waste heat from the electric component 15 such that the temperature thereof increases, and is supplied to the heater 52*a* through the heating line 41 connected to the coolant line 11.

Through the present operation, the coolant of which the temperature is increased by absorbing the waste heat of the electrical component 15 circulates through the heating apparatus 40. Thereafter, the coolant is cooled while passing through the radiator 12 through operation of the first water pump 14.

The coolant that has been completely cooled may recover waste heat while passing through the electrical component 15, and at the same time, may efficiently cool the electrical component 15.

Meanwhile, in the heating apparatus 40, the coolant having the temperature that has risen while passing through the electrical component 15 circulates along the heating line 41 through operation of the third water pump 42.

Accordingly, the coolant circulating the heating line 41 is supplied to the heater 52a, after passing through the condenser 53 through operation of the third water pump 42.

Herein, the second coolant heater 43 is operated when the temperature of the coolant circulating along the heating line 41 is lower than the target temperature, so that the coolant circulating in the heating line 41 may be heated.

On the other hand, when the air heater 45 is applied instead of the second coolant heater 43, the air heater 45 may be selectively operated depending on the temperature of the outside air passing through the heater 52a.

That is, the air heater 45 may be operated when the temperature of the outside air passing through the heater 52a is lower than a target temperature, heating the outside air flowing into the interior of the vehicle.

The air heater 45 is operated when the temperature of the outside air that has completed heat exchange with the high-temperature coolant while passing through the heater 52a is lower than a predetermined temperature or a target heating temperature.

When the air heater 45 is operated, the outside air may be heated while passing through the air heater 45, to be introduced into the vehicle interior in a state where the temperature is raised.

Herein, the opening and closing door 52b is opened such that the outside air flowing into the HVAC module 52 passes through the heater 52a.

As a result, the outside air inflow from the outside thereof flows into the internal in an uncooled temperature state when passing through the evaporator 56, which is not supplied with the refrigerant. The introduced outside air is converted to a high temperature state while passing through the heater 52a to be introduced into the interior of the vehicle, realizing the heating of the interior of the vehicle.

On the other hand, the coolant discharged from the heater 52a is cooled while passing through the radiator 12 along the coolant line 11 through operation of the first water pump 14. Thereafter, the cooled coolant may recover waste heat from the electrical component 15 while passing through the electrical component 15 and cool the electrical component 15 at the same time.

As a result, the coolant cooled in the radiator 12 may be supplied to the electrical component 15, preventing the electrical component 15 from overheating.

In other words, according to various exemplary embodiments of the present invention, it is possible to recover the waste heat generated in the electrical component 15 while repeating the above-described process, and use the waste heat for internal heating, reducing power consumption and improving overall heating efficiency.

Furthermore, in various exemplary embodiments of the present invention, as the coolant that has passed through the heating apparatus 40 is cooled in the radiator 12 and supplied to the electrical component 15, and the coolant may recover waste heat while passing through the electrical component 15 and efficiently cool the electrical component 15 at the same time.

In the exemplary embodiment of the present invention, an operation according to a low temperature dehumidification mode of the vehicle in the exemplary embodiment of the present invention will be described with reference to FIG. 9.

Figure 9:
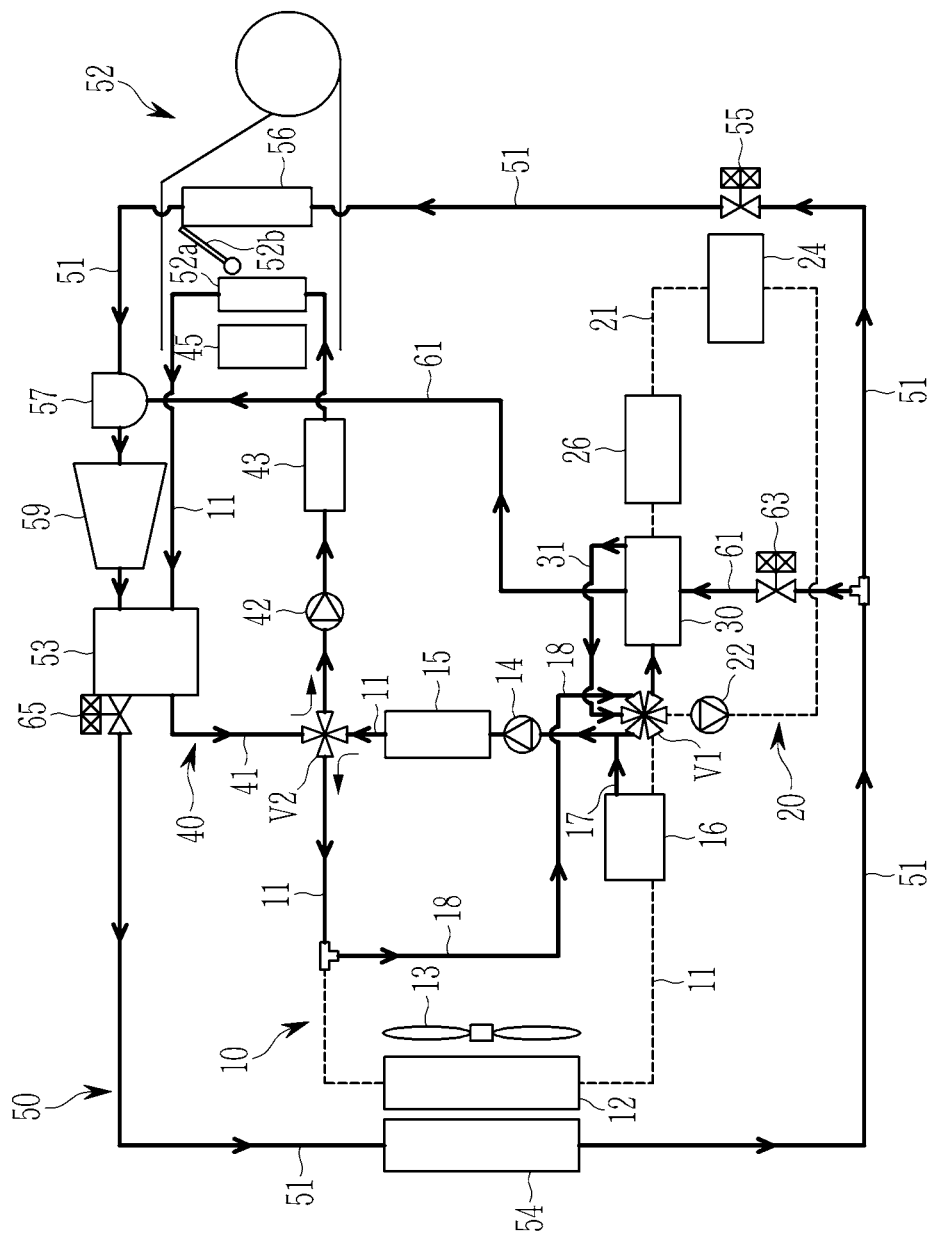
FIG. 9 illustrates an operational state diagram according to a low temperature dehumidification mode in a heat pump system for a vehicle according to various exemplary embodiments of the present invention.

FIG. 9 illustrates an operational state diagram according to a low temperature dehumidification mode in a heat pump system for a vehicle according to various exemplary embodiments of the present invention.

Herein, the low temperature dehumidification mode is a mode that operates when dehumidification is required in the vehicle interior in the heating mode of the vehicle.

Referring to FIG. 9, when the waste heat of the electrical component 15 is sufficient, the heat pump system may recover the waste heat of the electrical component 15 and use it for the internal heating of the vehicle.

First, in the cooling apparatus 10, the first water pump 14 is operated for circulation of the coolant. At the same time, the supply line 17 is opened.

Thus, a portion of the coolant stored in the reservoir tank 16 may be circulated along the coolant line 11 through the opened supply line 17.

Herein, the branch line 18 and the chiller connection line 31 are opened through operation of the first valve V1.

Accordingly, on the basis of the branch line 18, a portion of the coolant line 11 connected to the radiator 12 and a portion of the coolant line 11 connecting the radiator 12 and the reservoir tank 16 are closed through operation of the first valve V1.

In the present state, the coolant passing through the electrical component 15 may circulate along the opened branch line 18 and an opened portion of the coolant line 11 without passage through the radiator 12 through operation of the first water pump 14.

Herein, the coolant introduced into the first valve V1 through the branch line 18 may be introduced into the chiller 30 along a portion of the battery coolant line 21 connecting the chiller 30 and the first valve V1.

The coolant passing through the chiller 30 is introduced into the first valve V1 along the opened chiller connection line 31. Thereafter, the coolant is circulated in the coolant line 11 connected to the electrical component 15 through the first valve V1.

Meanwhile, in the battery cooling apparatus 20, the second water pump 22 is deactivated.

Thus, the coolant passing through the electrical component 15 continuously circulates along the coolant line 11, the branch line 18, an opened portion of the battery coolant line 21, and the chiller connection line 31 without passing through the radiator 12, and absorbs the waste heat from the electrical component 15 such that the temperature is increased.

The coolant with the increased temperature may be supplied to the chiller 30 provided at the battery coolant line 21. That is, the waste heat generated by the electrical component 15 raises the temperature of the coolant supplied to the chiller 30.

The coolant introduced from the branch line 18 to the first valve V1 through the fourth port P4 is introduced into the battery coolant line 21 connected to the chiller 30 through the fifth port P5.

Thereafter, the coolant passing through the chiller 30 is introduced into the third port P3 of the first valve V1 along the opened chiller connection line 31. The coolant introduced into the third port P3 is discharged to the coolant line 11 connected to the first water pump 14 through the second port P2 connected to the third port P3.

While repeatedly performing such an operation, the coolant absorbs the waste heat from the electric component 15 and may increase the temperature.

Meanwhile, in the heating apparatus 40, the coolant circulates along the heating line 41 through operation of the third water pump 42.

The coolant line 11 and the heating line 41 may form the independent closed circuit through operation of the second valve V2, respectively.

Thus, the coolant circulating through the heating line 41 may be supplied to the condenser 53 after passing through the heater 52a through operation of the third water pump 42.

As a result, the condenser 53 condenses the refrigerant supplied from the compressor 59 using the coolant circulating along the heating line 41.

At the present time, the temperature of the coolant circulating in the heating line 41 is increased by heat exchange with the refrigerant while passing through the condenser 53. The coolant with the increased temperature may be supplied to the heater 52a along the heating line 41.

Herein, the second coolant heater 43 is operated when the temperature of the coolant circulating along the heating line 41 is lower than the target temperature, so that the coolant circulating in the heating line 41 may be heated.

On the other hand, when the air heater 45 is applied instead of the second coolant heater 43, the air heater 45 operates when the temperature of the outside air passing through the heater 52a is lower than the target temperature, and the outside air introduced into the interior of the vehicle may be heated.

The air heater 45 is operated when the temperature of the outside air that has completed heat exchange with the high-temperature coolant while passing through the heater 52a is lower than a predetermined temperature or a target heating temperature.

When the air heater 45 is operated, the outside air may be heated while passing through the air heater 45, to be introduced into the vehicle interior in a state where the temperature is raised.

Meanwhile, in the air conditioner 50, each constituent element operates to heat and dehumidification the interior of the vehicle. Accordingly, the refrigerant is circulated along the refrigerant line 51.

Herein, the refrigerant line 51 connecting the condenser 53 and the evaporator 56 is opened through operation of the first expansion valve 55.

The refrigerant connection line 61 is opened through operation of the second expansion valve 63.

Herein, the first and second expansion valves 55 and 63 may expand the refrigerant supplied from the heat exchanger 54 to the refrigerant connection line 61 and the refrigerant line 51 such that the expanded refrigerant is supplied to the evaporator 56 and the chiller 30, respectively.

The third expansion valve 65 may also supply the refrigerant to the heat exchanger 54 by expanding the refrigerant supplied from the condenser 53.

Thus, the heat exchanger 54 recovers the external heat while evaporating the expanded refrigerant through heat exchange with the outside air.

The coolant, which absorbs the waste heat of the electrical component 15 and is increased in temperature, is recovered by increasing the temperature of the refrigerant supplied to the chiller 30 while passing through the chiller 30 through operation of the first water pump 14.

That is, the chiller 30 receives the refrigerant supplied from the heat exchanger 54 and expanded through operation of the second expansion valve 63 through the refrigerant connection line 61, and evaporates the supplied refrigerant through heat exchange with the coolant of which the temperature is increased while passing through the electrical component 15, recovering the waste heat of the electrical component 15.

Thereafter, the refrigerant passing through the chiller 30 is supplied to the accumulator 57 along the refrigerant connection line 61.

The refrigerant supplied to the accumulator 57 is separated into gas and liquid. of the refrigerant separated by gas and liquid, the gaseous refrigerant is supplied to the compressor 59.

The refrigerant compressed with the high temperature high pressure from the compressor 59 inflows to the condenser 53.

Herein, the refrigerant supplied to the condenser 53 may increase the temperature of the coolant by exchanging heat with the coolant circulating through the heating line 41. The coolant with raised temperature is supplied to the heater 52a.

On the other hand, the expanded refrigerant supplied to the evaporator 56 through operation of the first expansion valve 55 is supplied to the compressor 59 via the accumulator 57 along the refrigerant line 51 after heat exchanging with the outside air passing through the evaporator 56.

That is, the refrigerant passing through the evaporator 56 may be supplied to the compressor 59 along with the refrigerant introduced into the accumulator 57 through the refrigerant connection line 61.

The refrigerant compressed by the compressor 59 with high temperature and high pressure is then introduced into the condenser 53.

Herein, the opening and closing door 52b is opened so that the outside air introduced into the HVAC module 52 and passing through the evaporator 56 passes through the heater 52a.

That is, the outside air introduced into the HVAC module 52 is dehumidified while passing through the evaporator 56 by the refrigerant of the low temperature state introduced into the evaporator 56. Next, the outside air is converted into a high temperature state while passing through the heater 52a and introducing into the vehicle interior, heating and dehumidifying the interior of the vehicle.

That is, the heat pump system according to the exemplary embodiment of the present invention selectively absorbs the external heat depending on the internal temperature of the vehicle along with the waste heat generated from the electrical component 15 in the low temperature dehumidification mode of the vehicle by being used to increase the temperature of the refrigerant, reducing the power consumption of the compressor 59 and improving the heating efficiency.

Thus, if the heat pump system for the vehicle according to various exemplary embodiments of the present invention as described above is applied, the temperature of the battery module 24 may be adjusted depending on the mode of the vehicle by use of one chiller 30 for performing heat exchange between the coolant and the refrigerant, and the interior of the vehicle may be heated by use of the coolant, simplifying the entire system.

According to various exemplary embodiments of the present invention, it is also possible to improve the heating efficiency by recovering waste heat from the electrical component 15 and waste heat from the battery module 24 and using it for internal heating.

Furthermore, according to various exemplary embodiments of the present invention, it is possible to optimize the performance of the battery module 24 by efficiently controlling the temperature of the battery module 24, and increase an overall travel distance of the vehicle through efficient management of the battery module 24.

Furthermore, the present invention may use the second coolant heater 43 applied to the heating apparatus 40 to heat the battery module 24 or to assist in an internal heating of the vehicle, reducing the cost and weight.

Furthermore, the present invention selectively utilizes the external heat and the waste heat of the electrical component 15 and the battery module 24 in the heating mode of the vehicle, improving the heating efficiency.

The present invention also improves the condensing or evaporation performance of the refrigerant by use of the condenser 53 and the heat exchanger 54, improving the cooling performance and reducing the power consumption of the compressor 59.

Furthermore, the entire system may be simplified to reduce manufacturing cost and weight, and to improve space utilization.

In various exemplary embodiments of the present invention, a controller is connected to at least one of the elements of the heat pump system, to control the operations thereof.

In addition, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by multiple controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle, the heat pump system comprising:
    a cooling apparatus including a radiator, a first pump, a first valve, a second valve, and a reservoir tank which are connected through a coolant line to circulate a coolant in the coolant line to cool at least one electrical component provided in the coolant line;
    a battery cooling apparatus including a battery coolant line connected to the coolant line through the first valve, and a second pump and a battery module which are connected through the battery coolant line to circulate the coolant in the battery module;
    a chiller provided in the battery coolant line between the first valve and the battery module, and connected to a refrigerant line of an air conditioner through a refrigerant connection line, to adjust a temperature of the coolant by performing heat exchange between the coolant which is circulated in the battery coolant line and a refrigerant which is selectively supplied from the air conditioner;
    a heating apparatus including a heating line connected to the coolant line through the second valve to heat a vehicle interior by use of a coolant and a third pump and a heater provided on the heating line;
    a branch line having a first end portion connected to the coolant line between the radiator and the second valve, and a second end portion connected to the first valve; and
    a chiller connection line connecting the chiller and the first valve separately from the battery coolant line;
    wherein the reservoir tank is provided in the coolant line between the radiator and the first valve, and is connected to the coolant line connecting the first valve and the first pump through a supply line bypassing the first valve, and
    wherein a condenser included in the air conditioner is connected to the heating line to pass the coolant circulating through the heating apparatus.

2. The heat pump system of claim 1, wherein the first valve includes:
    a first port connected to the coolant line connected to the reservoir tank;
    a second port connected to the coolant line connected to the first pump;
    a third port connected to the chiller connection line;
    a fourth port connected to the branch line;
    a fifth port connected to the battery coolant line connected to the chiller; and
    a sixth port connected to the battery coolant line connected to the second pump.

3. The heat pump system of claim 2, wherein the first valve is configured to be operated to discharge the coolant through a port adjacent to a port into which coolant is introduced among the first port, the second port, the third port, the fourth port, the fifth port and the sixth port.

4. The heat pump system of claim 1, wherein the air conditioner includes:

a heating, ventilation, and air conditioning (HVAC) module including an evaporator which is connected thereto through the refrigerant line and a door configured to control outside air passing through the evaporator to be selectively introduced into the heater depending on a cooling mode, a heating mode, and a heating and dehumidification mode of the vehicle therein;

the condenser provided in the heating line between the second valve and the heater to circulate a coolant therein to perform heat exchange between the coolant and a refrigerant supplied through the refrigerant line;

a compressor connected between the evaporator and the condenser through the refrigerant line;

a heat exchanger provided on the refrigerant line between the condenser and the evaporator;

a first expansion valve provided in the refrigerant line between the heat exchanger and the evaporator;

a second expansion valve provided in the refrigerant connection line;

an accumulator provided in the refrigerant line between the evaporator and the compressor and connected to the refrigerant connection line; and a third expansion valve provided in the refrigerant line between the condenser and the heat exchanger.

5. The heat pump system of claim 4, wherein the heat exchanger additionally condenses or evaporates the refrigerant condensed in the condenser through heat exchange with the outside air depending on a selective operation of the third expansion valve.

6. The heat pump system of claim 4,
wherein the second expansion valve expands the refrigerant introduced through the refrigerant connection line to flow to the chiller when cooling the battery module by the refrigerant, and
wherein the third expansion valve selectively expands the refrigerant introduced into the heat exchanger in the heating mode and a low temperature dehumidification mode of the vehicle.

7. The heat pump system of claim 4,
wherein a first end portion of the refrigerant connection line is connected to the refrigerant line between the heat exchanger and the first expansion valve, and
wherein a second end portion of the refrigerant connection line is connected to the accumulator.

8. The heat pump system of claim 4, wherein each of the chiller and the condenser is a water-cooled heat exchanger, and the heat exchanger is an air-cooled heat exchanger.

9. The heat pump system of claim 4, wherein the HVAC module further includes an air heater provided at a side opposite to the evaporator with respect to the heater which is interposed between the air heater and the evaporator to selectively heat the outside air passing through the heater.

10. The heat pump system of claim 9, wherein the air heater is configured to be operated to raise a temperature of the outside air passing through the heater when a temperature of a coolant supplied to the heater is lower than a target temperature for internal heating.

11. The heat pump system of claim 4, wherein
when the battery module is cooled in the cooling mode of the vehicle,
in the cooling apparatus, the coolant is circulated in the coolant line by operation of the first pump, and the supply line is opened;
the branch line and the chiller connection line are closed through operation of the first valve;

the coolant line and the battery coolant line form an independent closed circuits through operation of the first valve;
in the battery cooling apparatus, the coolant passing through the chiller is supplied to the battery module along the battery coolant line through operation of the second pump;
in the heating apparatus, the coolant line and the heating line are connected through operation of the second valve so that the coolant is supplied from the cooling apparatus;
in the air conditioner, in a state that the refrigerant connection line is opened through operation of the second expansion valve, the refrigerant circulates along the refrigerant line and the refrigerant connection line;
the first and second expansion valves expand the refrigerant so that the expanded refrigerant is respectively supplied to the evaporator and the chiller; and
the third expansion valve inflows the refrigerant supplied from the condenser to the heat exchanger.

12. The heat pump system of claim 11,
wherein the heating apparatus is configured to supply the coolant supplied from the cooling apparatus through operation of the third pump to the condenser, and
wherein the condenser condenses the refrigerant through heat exchange with the coolant, and the heat exchanger additionally condenses the refrigerant introduced from the condenser through heat exchange with the outside air.

13. The heat pump system of claim 4, wherein
when recovering a waste heat of an external heat source and the at least one electrical component in the heating mode of the vehicle,
the branch line and the chiller connection line are opened through operation of the first valve, and the supply line is opened;
in the cooling apparatus, on a basis of the branch line, a portion of the coolant line connected to the radiator and the reservoir tank is closed, and the coolant passing through the at least one electrical component circulates along the opened branch line and an opened portion of the coolant line without passage through the radiator through operation of the first pump;
the coolant introduced into the first valve through the branch line is introduced into the chiller along a portion of the battery coolant line connecting the chiller and the first valve;
the coolant passing through the chiller is introduced into the first valve along the opened chiller connection line, and then is circulated in the coolant line connected to the at least one electrical component through the first valve;
the coolant line and the heating line form an independent closed circuits through operation of the second valve, respectively;
in the heating apparatus, the coolant circulates along the heating line through operation of the third pump;
in the air conditioner, the refrigerant line connecting the condenser and the evaporator is closed through operation of the first expansion valve;
the refrigerant connection line is opened through operation of the second expansion valve;
the second expansion valve expands a refrigerant supplied to the refrigerant connection line and supplies the expanded refrigerant to the chiller; and the third expansion valve expands the refrigerant supplied from the condenser to be supplied to the heat exchanger.

14. The heat pump system of claim 4, wherein
when recovering a waste heat of an external heat source and the battery module in the heating mode of the vehicle,
the branch line and the chiller connection line are closed through operation of the first valve, and the supply line is closed;
the cooling apparatus is deactivated;
in the battery cooling apparatus, the battery coolant line is not connected to the coolant line through operation of the first valve, and the coolant passing through the battery module is supplied to the chiller through operation of the second pump;
in the heating apparatus, the heating line is not connected to the coolant line through operation of the second valve, and the coolant circulates along the heating line through operation of the third pump;
in the air conditioner, the refrigerant line connecting the condenser and the evaporator is closed through operation of the first expansion valve;
the refrigerant connection line is opened through operation of the second expansion valve;
the second expansion valve expands a refrigerant supplied to the refrigerant connection line and supplies the expanded refrigerant to the chiller; and
the third expansion valve expands the refrigerant supplied from the condenser to be supplied to the heat exchanger.

15. The heat pump system of claim 4, wherein
when performing a low temperature dehumidification mode of the vehicle,
the branch line and the chiller connection line are opened through operation of the first valve, and the supply line is opened;
in the cooling apparatus, on a basis of the branch line, a portion of the coolant line connected to the radiator and the reservoir tank is closed, and the coolant passing through the at least one electrical component circulates along the opened branch line and an opened portion of the coolant line without passage through the radiator through operation of the first pump;
the coolant introduced into the first valve through the branch line is introduced into the chiller along a portion of the battery coolant line connecting the chiller and the first valve;
the coolant passing through the chiller is introduced into the first valve along the opened chiller connection line, and then is circulated in the coolant line connected to the at least one electrical component through the first valve;
the coolant line and the heating line form an independent closed circuits through operation of the second valve, respectively;
in the heating apparatus, the coolant circulates along the heating line through operation of the third pump;
in the air conditioner, the refrigerant is circulated along the refrigerant line and the refrigerant connection line opened through operation of the first and second expansion valves, respectively;
the first and second expansion valves expand the refrigerant so that the expanded refrigerant is respectively supplied to the evaporator and the chiller;

the third expansion valve expands the refrigerant supplied from the condenser to be supplied to the heat exchanger.

16. The heat pump system of claim 1, wherein
when cooling the at least one electrical component and the battery module by use of the coolant,
the branch line is closed through operation of the first valve;
the chiller connection line is opened through operation of the first valve, and the supply line is opened;
a portion of the battery coolant line connecting the chiller and the first valve is closed through operation of the first valve;
the coolant line connecting the reservoir tank and the first valve is connected to the battery coolant line through operation of the first valve;
the coolant cooled in the radiator passes through the battery module along the battery coolant line from the first valve through operation of the first and second pumps;
the coolant passing through the battery module is introduced from the chiller to the first valve along the opened chiller connection line, and then is supplied to the at least one electrical component while flowing along the coolant line connected to the first pump.

17. The heat pump system of claim 1, wherein
when using a waste heat of the at least one electrical component without operating the air conditioner in a heating mode of the vehicle,
the branch line and the chiller connection line are opened through operation of the first valve;
in the cooling apparatus, on a basis of the branch line, the coolant line connected to the radiator, the reservoir tank, and the first valve are closed;
the supply line is opened;
the battery coolant line except for the battery coolant line connected to the chiller is closed through operation of the first valve;
in the heating apparatus, the heating line is connected to the coolant line through operation of the second valve;
the coolant having a temperature that has risen while passing through the at least one electrical component by operation of the first pump is supplied to the heating line connected to the opened coolant line without passing through the radiator;
the coolant introduced into the heating line is supplied to the heater through operation of the third pump;
the coolant discharged from the heater is introduced into the first valve along the opened coolant line and the opened branch line;
the coolant introduced into the first valve is again introduced into the first valve along the opened chiller connection line after passing through the chiller along the opened portion of the battery coolant line; and
the coolant again introduced into the first valve is supplied to the at least one electrical component along the opened the coolant line.

18. The heat pump system of claim 1, wherein
when using a waste heat of the at least one electrical component without operating the air conditioner and cooling of the at least one electrical component is required, in a heating mode of the vehicle,
the branch line and the chiller connection line are closed through operation of the first valve;
in the cooling apparatus, the coolant line is opened;
the supply line is opened;
the battery cooling apparatus is deactivated;

in the heating apparatus, the heating line is connected to the coolant line through operation of the second valve;

the coolant having a temperature that has risen while passing through the at least one electrical component by operation of the first pump is supplied to the heating line connected to the coolant line;

the coolant introduced into the heating line is supplied to the heater through operation of the third pump; and the coolant discharged from the heater is cooled while passing through the radiator along the coolant line through operation of the first pump, and then recovers waste heat from the at least one electrical component while passing through the at least one electrical component and cools the at least one electrical component at a same time.

19. The heat pump system of claim 1, wherein the supply line is connected to the coolant line, when the coolant is circulated to the coolant line by the operation of the first pump.

20. The heat pump system of claim 1, wherein the battery cooling apparatus further includes a first coolant heater provided in the battery coolant line between the battery module and the chiller, and the first coolant heater is operated to heat the coolant supplied to the battery module along the battery coolant line, when the battery module is heated.

* * * * *